United States Patent
Nabetani et al.

(10) Patent No.: US 10,439,788 B2
(45) Date of Patent: Oct. 8, 2019

(54) WIRELESS COMMUNICATION DEVICE

(71) Applicant: KABUSHIKI KAISHA TOSHIBA, Minato-ku, Tokyo (JP)

(72) Inventors: Toshihisa Nabetani, Kanagawa (JP); Tsuguhide Aoki, Kanagawa (JP); Takayuki Nishio, Kyoto (JP); Masahiro Morikura, Nara (JP); Koji Yamamoto, Kyoto (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 158 days.

(21) Appl. No.: 15/215,976

(22) Filed: Jul. 21, 2016

(65) Prior Publication Data

US 2017/0026162 A1   Jan. 26, 2017

(30) Foreign Application Priority Data

Jul. 23, 2015   (JP) .................................. 2015-146206

(51) Int. Cl.
| | |
|---|---|
| *H04J 3/00* | (2006.01) |
| *H04L 5/14* | (2006.01) |
| *H04W 28/12* | (2009.01) |
| *H04L 1/12* | (2006.01) |
| *H04W 74/08* | (2009.01) |
| *H04W 84/12* | (2009.01) |

(52) U.S. Cl.
CPC .................. *H04L 5/14* (2013.01); *H04L 1/12* (2013.01); *H04W 28/12* (2013.01); *H04W 74/0816* (2013.01); *H04W 84/12* (2013.01)

(58) Field of Classification Search
CPC ............................ H04L 5/14; H04W 74/0816
See application file for complete search history.

(56) References Cited

U.S. PATENT DOCUMENTS

| | | | | |
|---|---|---|---|---|
| 2008/0064368 A1* | 3/2008 | Yamashita | ............ | H04W 12/06 455/411 |
| 2014/0078940 A1* | 3/2014 | Aggarwal | ............ | H04L 1/1854 370/278 |

(Continued)

FOREIGN PATENT DOCUMENTS

| | | |
|---|---|---|
| WO | WO 2015/039094 A1 | 3/2015 |
| WO | WO-2016/175328 A1 | 11/2016 |
| WO | WO-2016/175329 A1 | 11/2016 |

OTHER PUBLICATIONS

G. Bianchi "Performance analysis of the IEEE 802.11 distributed coordination function," IEEE Journal on Selected Areas in Communications, vol. 18, No. 3, pp. 535-547, Mar. 2000.

(Continued)

*Primary Examiner* — Chi H Pham
*Assistant Examiner* — Fahmida S Chowdhury
(74) *Attorney, Agent, or Firm* — Foley & Lardner LLP

(57) ABSTRACT

According to one embodiment, a wireless communication device includes: a communicator and controlling circuitry. The communicator is configured to simultaneously communicate a first frame and a second frame, and after the first frame and the second frame are communicated, communicate a third frame indicating acknowledgement of the first frame and a fourth frame indicating acknowledgement of the second frame. The controlling circuitry is configured to control to prevent the third frame and the fourth frame from being simultaneously communicated.

19 Claims, 21 Drawing Sheets

(56) References Cited

U.S. PATENT DOCUMENTS

| | | | | |
|---|---|---|---|---|
| 2014/0169233 | A1* | 6/2014 | Aggarwal | H04W 74/08 370/277 |
| 2015/0071204 | A1* | 3/2015 | Seok | H04B 7/0452 370/329 |
| 2015/0139106 | A1* | 5/2015 | Masuda | H04W 74/0816 370/329 |
| 2018/0007561 | A1 | 1/2018 | Adachi et al. | |
| 2018/0007701 | A1 | 1/2018 | Adachi et al. | |

OTHER PUBLICATIONS

IEEE Std 802.11acTM-2013; IEEE Standard for Information technology—Telecommunications and information exchange between systems Local and metropolitan area networks—Specific requirements, "Part 11: Wireless LAN Medium Access Control (MAC) and Physical Layer (PHY) Specifications, Amendment 4: Enhancements for Very High Throughput for Operation in Bands below 6 Ghz", LAN/MAN Standards Committee of the IEEE Computer Society, IEEE-SA Standards Board, Dec. 18, 2013, 425 pages.

IEEE Std 802.11TM 2012 (Revision of IEEE Std 802.11-2007) IEEE Standard for Information Technology—Telecommunications and information exchange between systems—Local and metropolitan area networks—Specific requirements, "Part 11: Wireless LAN Medium Access Control (MAC) and Physical Layer (PHY) Specifications," LAN/MAN Standards Committee of the IEEE Computer Society, IEEE-SA Standards Board, Mar. 29, 2012, 2793 pages.

K. Tamaki et al. "Full Duplex Media Access Control for Wireless Multi-Hop Networks," 2013 IEEE 77th Veh. Technol. Conf. (VTC Spring), pp. 1-5, Jun. 2013.

M. Duarte et al. "Design and Characterization of a Full-Duplex Multiantenna System for WiFi Networks," IEEE Trans. Veh. Technol., vol. 63, No. 3, pp. 1160-1177, Mar. 2014.

S. Goyal et al. "A distributed MAC protocol for full duplex radio," in 2013 Asilomar Conference on Signals, Systems and Computers, 2013, pp. 788-792.

S. Kim et al., "On the performance of full duplex wireless networks," in 2013 47th Annual Conference on Information Sciences and Systems (CISS), 2013, pp. 1-6.

Stacey, Robert: "Specification Framework for TGax", IEEE 11-15-0132-07-00ax-spec-framework, Intel, Jul. 2015, pp. 1-13.

Stacey, Robert: "Specification Framework for TGax", IEEE 11-15-0132-17-00ax-spec-framework, Intel, May 2016, pp. 1-61.

* cited by examiner

WIRELESS COMMUNICATION DEVICE

CROSS-REFERENCE TO RELATED APPLICATIONS

This application is based upon and claims the benefit of priority from Japanese Patent Application No. 2015-146206, filed Jul. 23, 2015; the entire contents of which are incorporated herein by reference.

FIELD

An embodiment of the present invention relates to a wireless communication device and a wireless communication method.

BACKGROUND

As a technique for improving system throughput in an environment where a large number of terminals exist, a technique of full-duplex communication has been considered. In full-duplex communication, a single terminal performs transmission and reception at the same time, thereby improving throughput. Relating to a wireless LAN (local area network) standard, a MAC protocol has been proposed which not only enables simultaneous transmission and reception of a data frame but also enables simultaneous transmission and reception of a delivery acknowledgement frame (ACK frame, etc.), which follows the data frame.

However, the conventional technique of full-duplex communication focuses on solving the interference in a terminal and a design of a MAC protocol is not fully considered. Accordingly, when full-duplex communication is performed using an existing MAC protocol, opportunities of terminals to acquire a transmission right to a wireless medium may be unequal and the performance may be considerably degraded.

DETAILED DESCRIPTION

According to one embodiment, a wireless communication device includes: a communicator and controlling circuitry. The communicator is configured to simultaneously communicate a first frame and a second frame, and after the first frame and the second frame are communicated, communicate a third frame indicating acknowledgement of the first frame and a fourth frame indicating acknowledgement of the second frame. The controlling circuitry is configured to control to prevent the third frame and the fourth frame from being simultaneously communicated.

Hereinafter, embodiments of the present invention will be described with reference to the drawings. The entire contents of IEEE Std 802.11™-2012 and IEEE Std 802.11ac™-2013, known as the wireless LAN specification are herein incorporated by reference in the present specification.

First Embodiment

Figure 1:
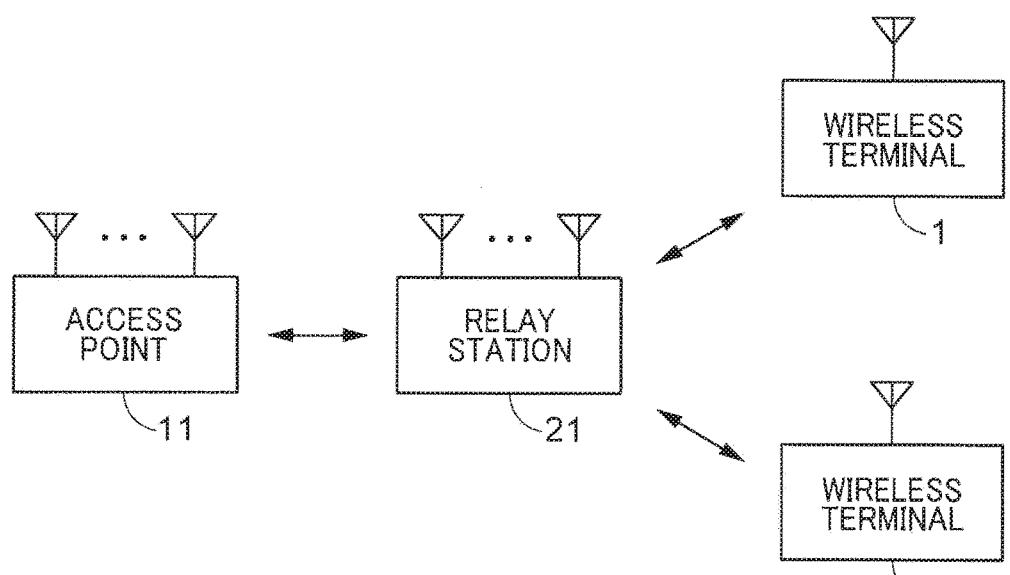
FIG. 1 is a diagram illustrating a wireless communication system according to an embodiment.

FIG. 1 illustrates a wireless communication system according to a first embodiment.

The wireless communication system in FIG. 1 is a wireless LAN including an access point (AP) 11 which is a base station, a relay station 21, and a plurality of wireless terminals (hereinafter, "terminals") 1, 2. Each of the access point 11 and the relay station 21 is also a certain form of a terminal, but differs from the terminal 1 and the terminal 2 in that the access point 11 and the relay station 21 have relay functions, etc. The access point 11, the relay station 21, the terminal 1, and the terminal 2 are assumed to perform communication in accordance with the IEEE802.11 standard. However, the access point 11, the relay station 21, the terminal 1, and the terminal 2 may be configured to perform communication in accordance with another communication scheme.

The access point 11 has one or more antennas. The access point 11 has a wireless communication device mounted thereto, which transmits and receives a MAC frame (hereinafter, "frame") through the antennas. The wireless communication device includes a wireless communicator that transmits and receives a signal wirelessly, and controlling circuitry (which may be called a controller or a communication control device) that controls communication by transmitting and receiving a frame via the wireless communicator. For example, the access point forms a wireless communication group which is a basic service set (BSS) in sense of the IEEE802.11 standard.

The terminal 1 and the terminal 2 each have one or more antennas. Each terminal has a wireless communication device mounted thereto, which transmits and receives a frame through the antennas. The wireless communication device includes a wireless communicator that transmits and receives a signal wirelessly, and controlling circuitry (which may be called a controller or a communication control device) that controls communication by transmitting and receiving a frame via the wireless communicator.

The relay station 21 has one or more antennas. The relay station 21 has a wireless communication device mounted thereto, which transmits and receives a frame through the antennas. The wireless communication device includes a wireless communicator that transmits and receives a signal wirelessly, and controlling circuitry (which may be called a controller or a communication control device) that controls communication with the access point 11 and the terminals 1 and by transmitting and receiving a frame via the wireless communicator.

The relay station 21 relays communication among the access point 11, the terminal 1, and the terminal 2. More specifically, the relay station 21 relays a frame received from the access point 11 to at least one of the terminals 1 and 2, and relays a frame received from at least one of the terminals 1 and 2 to the access point 11. In some cases, the relay station 21 relays communication between the terminal 1 and the terminal 2. The relay station 21 decodes a signal received (demodulates a signal, or performs decoding of an error correction signal, in some cases) to acquire a frame and analyses the header of the frame, and the like. The relay station 21 generates a header for transmission on the basis of the analysis result, and adds the data portions (body field) of the frame to the header, thereby generating a frame to be transmitted (relayed). The relay station 21 may further relay a broadcast frame such as a beacon frame and a multicast frame, in addition to a unicast frame.

The configuration of the relay station 21 is not limited to a specific configuration as long as the relay station 21 can relay a frame among the terminals and the access point. For example, the relay station 21 as well as the terminal 1 and the terminal 2 may belong, as a subordinate terminal under the access point 11, to the BSS of the access point. Alternatively, the relay station 21 may have a function as an access point, form a BSS separately from that of the access point 11, and the terminal 1 and the terminal 2 may belong to this BSS. In this case, the access point 11 and the relay station 21 may use a common wireless channel. Further, in this case, the access point and the relay station may use the same SSID and the same encryption setting such that the terminal 1 and the terminal 2 can decode a frame transmitted from the access point 11. Other than the configurations described above, any configuration can be used as long as the relay station can relay a frame among the terminals and the access point.

In the present embodiment, a frame is transmitted and received in communication. However, in actual communication, a physical packet obtained by adding a physical header (PHY header) to a frame may be transmitted and received. The expression "transmission or reception of frames" in the description below may indicate a case where physical packets including frames are actually transmitted or received. Further, the expression "length of a frame" or "frame length" in the description below may indicate the length of a physical packet including the frame or the packet length.

The access point 11 may be further connected to a separate network different from the wireless network to which the relay station 21 belongs. This separate network may be a wired network, may be a wireless network, or may be a wired/wireless hybrid network. In this case, the access point 11 may relay communication between the separate network and the wireless network to which the relay station 21 belongs. Another terminal or another relay station (not illustrated) may be further connected to the wireless network of the access point, to which the relay station 21 belongs. Only one relay station exists among the terminal 1, the terminal 2, and the access point 11. However, a plurality of relay stations may exist so as to relay a frame, at multiple stages, among the access point 11 and the terminals 1 and 2.

The relay station 21 is a terminal that can perform full-duplex communication according to the present embodiment, and can perform communication (transmission, reception, or both) of a plurality of frames with one or more terminals (including the access point) at the same frequency (wireless channel), at the same time (i.e., in parallel). The relay station 21 and the access point 11 have the characteristic functions of the present embodiment, and hereinafter, are referred to as "full-duplex compatible terminal" in some cases. The access point 11 has a configuration for performing full-duplex communication in some cases, and does not have the configuration in other cases. In any case, however, the access point 11 has the characteristic functions of the present embodiment. The terminal 1 and the terminal 2 may be legacy terminals (referred to as "full-duplex incompatible terminal"). However, the terminal 1 and the terminal 2 may be full-duplex compatible terminals having the characteristic functions of the present embodiment, in some cases.

Figure 2:
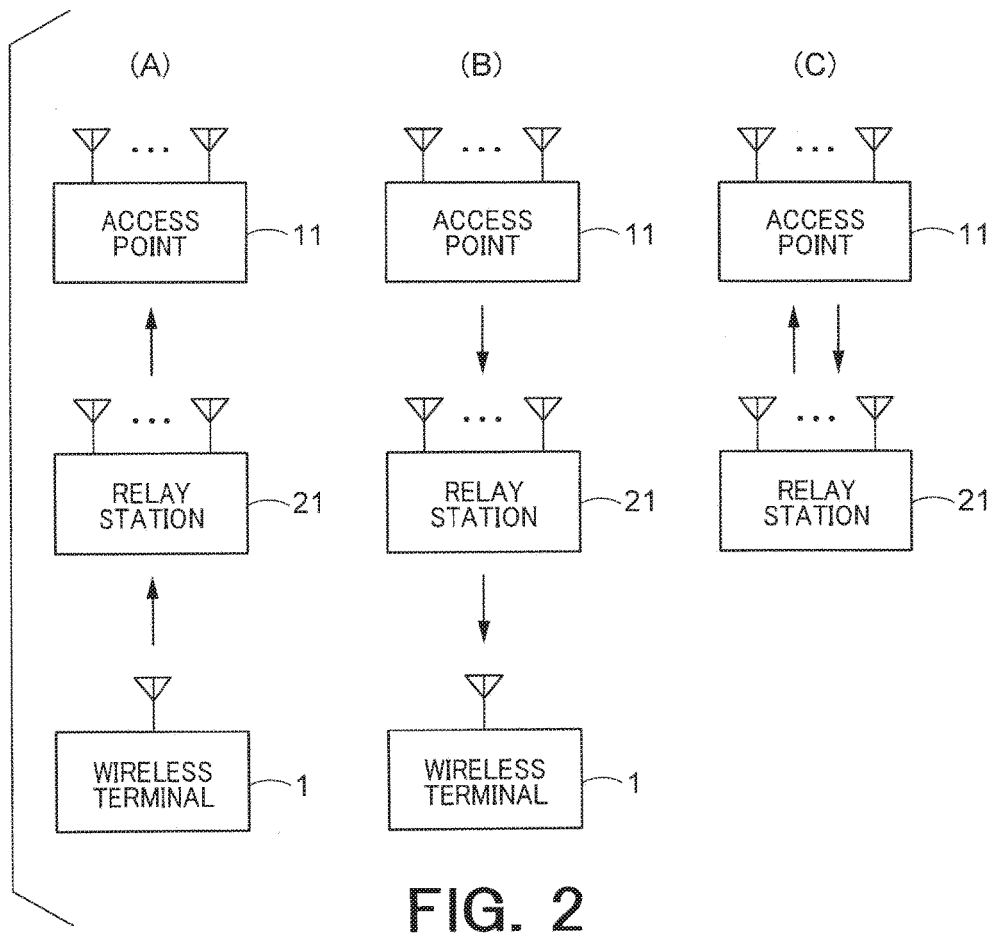
FIG. 2 is a diagram illustrating a plurality of traffic patterns.

Descriptions of traffic patterns in full-duplex communication are given below. FIG. 2 illustrates a plurality of traffic pattern examples in full-duplex communication. The present embodiment is applicable to any one of these patters.

FIG. 2(A) illustrates a first traffic pattern. The relay station 21 receives a frame from a terminal (here, the terminal 1) and transmits a frame to the access point 11 at the same time (i.e., in parallel). In this pattern, the access point 11 does not need to have a configuration for performing full-duplex communication.

FIG. 2(B) illustrates a second traffic pattern. The relay station 21 receives a frame from the access point 11 and transmits a frame to the terminal 1 at the same time (i.e., in parallel). In this pattern, the access point 11 does not need to have a configuration for performing full-duplex communication.

FIG. 2(C) illustrates a third traffic pattern. The relay station 21 receives a frame from the access point 11 and transmits a frame to the access point 11 at the same time (i.e., in parallel). In this pattern, the access point 11 also performs full-duplex communication.

Figure 3:
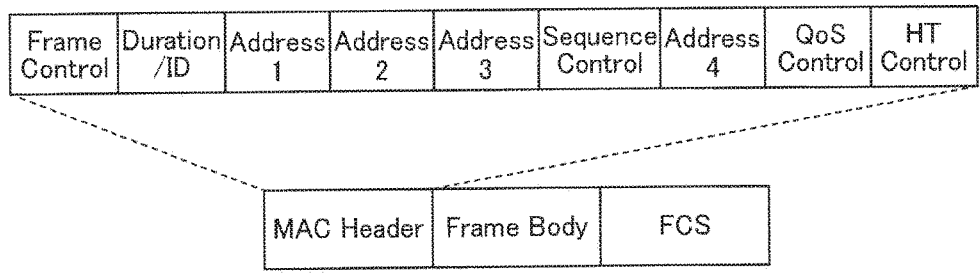
FIG. 3 is a diagram illustrating a basic format example of a frame according to a first embodiment.

FIG. 3 illustrates a basic format example of a frame according to the present embodiment. The frame format in FIG. 3 includes a MAC header, a frame body, and an FCS (frame check sequence). In the IEEE 802.11 standard, frame types broadly include a data frame, a management frame and a control frame. Basically, all of these frame types are based on this format. Some fields may be omitted from or other fields may be added to the frame format in FIG. 3.

A frame type to be transmitted and received in full-duplex communication is not necessarily limited to a specific type. Any of a data frame, a management frame, and a control frame may be communicated in full-duplex communication. For example, a plurality of data frames can be transmitted and received at the same time, and arbitrary combination among a control frame, a data frame, and a management frame can be transmitted and received at the same.

As illustrated in FIG. 3, the MAC header includes fields which are a Frame Control, a Duration/ID (hereinafter, referred to as "Duration"), an Address 1, an Address 2, an Address 3, a Sequence Control, an Address 4, a QoS Control, and an HT (high throughput) Control.

In the Frame Control field, information including a frame type is set. The frame type is identified using two fields which are a Type and a Subtype in the frame control field. The type such as a control frame, a management frame, or data frame is identified by the Type. A more detailed frame type of the type is divided by the Subtype. For example, control frames include an RTS (request to send) frame that requests transmission permission, a CTS (clear to send) frame that gives a notice of transmission permission, and an ACK frame that indicates transmission confirmation. These frame types can be identified by the Subtype. Details of a control frame, a management frame, and a data frame will be described in another embodiment.

In the Duration field, a medium reservation time period that indicates the length of a time period in which a wireless medium is exclusively used is set. For example, a terminal (a terminal, a relay station, or an access point) receives a frame not addressed to the terminal, it is determined that a medium is virtually busy over the medium reservation time period after the end of a PHY packet that includes this frame. A system for determining that the medium is virtually busy, or a time period during which the medium is determined to be virtually busy is called an NAV (network allocation vector).

Into each Address field 1 to 4, a MAC address (hereinafter, referred to as "address") or a BSSID (basic service set identifier) which is the identifier of a BSS formed by the access point are put. All the Address fields 1 to 4 do not necessarily exist. For example, a configuration lacking the Address 4 field or a configuration lacking the Address fields 2 to 4 may be used.

The Address field 1 stores therein an address (a receiver address (RA)) of a direct reception destination of the frame. The Address field 2 stores therein an address (a transmitter address (TA)) of a direct transmission source of the frame. The Address field 3 stores therein an address (a destination address (DA)) of a final destination of the frame, or an address (a source address (SA)) of a first transmission source which starts transmission of the frame, or a BSSID which is the identifier of a BSS. The Address field 4 stores therein an SA or a BSSID. In the Address 1, the RA may match the DA. In the Address 2, the TA may match the SA. The address of an access point or a relay station usually matches the BSSID of the BSS formed by the access point or the relay station. Specific examples for setting in the Address fields 1 to 4 are described below according to transmission forms of a frame.

As an example, as for a frame to be transmitted directly from a certain terminal to a separate terminal, the address of the separate terminal is set as a receiver address (RA) in the Address 1 field of the frame. Other than the address (a unicast address) of the terminal, a broadcast address or a multicast address may be set as the RA address (the same applies hereinafter). The address of the certain terminal is set as a transmitter address (TA) in the Address 2 field. The BSSID (basic service set identifier) (which may be a wildcard BSSID which has all bits set to 1 and corresponds to all BSSIDs, the same applies hereinafter) is set in the Address 3 field. The Address 4 field may not be used in some cases.

As for a frame to be transmitted from a relay station to a terminal, the address of the terminal as a reception destination is set as an RA in the Address 1 field of the frame. The address of the relay station as a transmission source or the BSSID is set as a TA in the Address 2 field. An SA or the BSSID is set in the Address 3 field. The Address 4 field may not be used in some cases.

As for a frame to be transmitted from a terminal to a relay station, the address of the relay station as a reception destination or the BSSID is set as an RA in the Address 1 field of the frame. The address of the terminal is set as a TA in the Address 2 field. A DA or the BSSID is set in the Address 3 field. The Address 4 field may not be used in some cases.

As for a frame to be transmitted from an access point to a relay station, the address of the relay station as a reception destination or the BSSID is set as an RA in the Address 1 field of the frame. The address of the access point as a transmission source or the BSSID is set as a TA in the Address 2 field. A DA or the BSSID is set in the Address 3 field. An SA or the BSSID is set in the Address 4. Also, as for a frame to be transmitted from a relay station to an access point, the same applies except an address and the BSSID are replaced with each other between the relay station and the access point.

Setting of an address or the BSSID in the Address 1 to 4 is not limited to a particular method. Another method may be used as long as the method is commonly recognized by an access point, a relay station, and a terminal of a system.

In a Sequence Control field, a sequence number of a frame etc. is set. A QoS field is used to perform QoS control for transmission in which the priority of a frame is taken into consideration.

In a Frame Body field, data or information to be transmitted to a final destination is stored as the payload of a frame.

In an FCS field, FCS information of a frame is set. Examples of FCS information include a CRC (cyclic redundancy code). FCS information is used by a reception side to perform error detection on a frame body field.

Here, possible unequal opportunities to acquire a transmission right (also referred to as "access right" in some cases) in full-duplex communication through a wireless LAN will be described.

Figure 4:
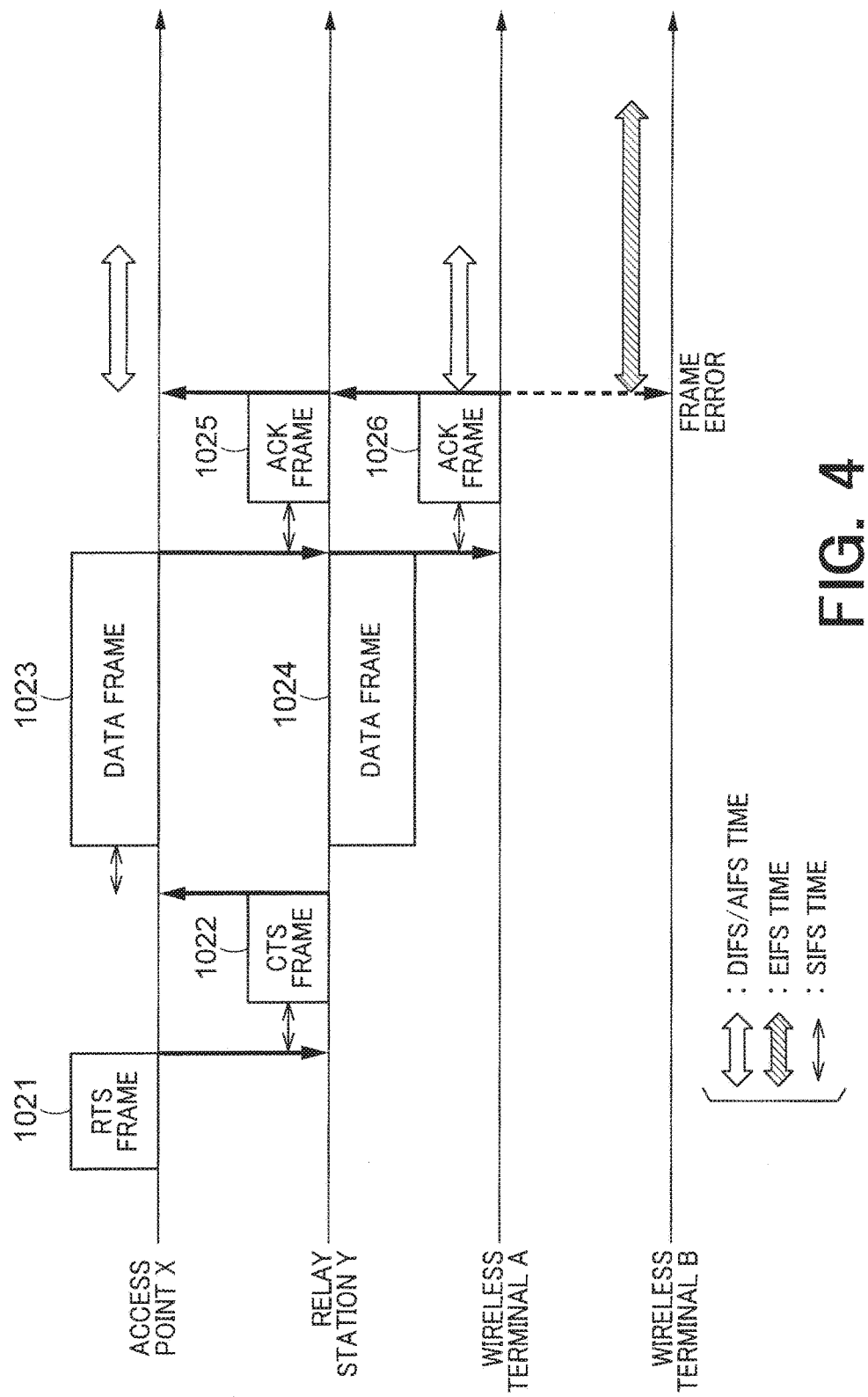
FIG. 4 is a diagram illustrating an example of a communication sequence performed among an access point, a relay station, and terminals.

FIG. 4 illustrates a sequence example of communication among an access point X, a relay station Y, and terminals A and B. The access point, the relay station, and the terminals are denoted by different reference characters from those according to the embodiment illustrated in FIG. 1 for distinction. Descriptions will be given of problems that may occur when the relay station Y performs full-duplex communication with the access point X and the terminal A. In the present embodiment, the expression that a certain frame is transmitted from a certain terminal (which may be a relay station or an access point in some cases) to a separate terminal means that the RA of the frame is the address of the separate terminal or a BSSID and the TA of the frame is the address of the certain terminal or the BSSID.

It is assumed that the access point X holds a frame to be transmitted and acquires a transmission right to a wireless medium under CSMA/CA. That is, the access point X performs carrier sense in a carrier sense time which is a total of a fixed time and a randomly determined backoff time. For example, when a reception signal level (a CCA (clear channel assessment) value) is lower than a threshold, the access point X determines that the wireless medium is idle, and acquires a transmission right. In CCA processing, which is performed for performing CSMA/CA, transmission is allowed only when it is determined that a wireless medium is vacant (idle) by assessment of the vacant state of the wireless medium prior to the transmission. In TXOP based on the acquired transmission right, the access point X transmits an RTS (request to send) frame 1021 to the relay station Y. The transmitter address (TA) of the RTS frame 1021 is the address of the access point X. The receiver address (RA) of the RTS frame 1021 is the relay station Y. The access point X sets a medium reservation time in the Duration field of the RTS frame 1021 to be transmitted. For example, the access point X may calculate a time period of communication required after transmission of the RTS frame, and set the calculated value or a value larger than the calculated value as a value of the medium reservation time.

The RTS frame 1021 transmitted from the access point X is received by the relay station Y. It is assumed that the terminals A and B fail to receive the RTS frame 1021 due to a shielding object or a long distance, or otherwise, that the terminals A and B succeeds in receiving the RTS frame 1021 but the frame reception is too weak to be recognized.

The relay station Y transmits a CTS (clear to send) frame 1022 after elapse of an SIFS (short interframe space) time since reception of the RTS frame 1021. Such an SIFS time is an example, and any other time may be used as long as the time is a fixed time. Hereinafter, the same applies for the expression "SIFS time". The destination address (RA) of the CTS frame 1022 is the access point X. A transmitter address is generally lacked. As an example, in the Duration field of the CTS frame 1022, a value obtained by subtracting an SIFS time and a time required for transmission of the CTS frame 1022 from the value in the Duration field of the RTS frame 1021 is set. The CTS frame 1022 is received by the access point X and the terminals A and B. The terminals A and B set an NAV during a period of the value set in the Duration field since completion of reception of the CTS frame 1022 because the CTS frame 1022 is not addressed to the terminal A or B. Even when a terminal having set an NAV holds a frame to be transmitted, the terminal refrains from transmitting or waits to transmit the frame during a set period (transmission restraint period).

The access point X having received the CTS frame 1022 transmits a frame (here, a data frame) 1023 after elapse of an SIFS time since completion of the reception. At the same time, the relay station Y transmits a data frame 1024 which has been held to be transmitted to the terminal A. That is, the relay station Y transmits the data frame 1024 after elapse of an SIFS time since completion of transmission of the CTS frame 1022. Accordingly, the relay station Y receives the data frame 1023 from the access point X and transmits the data frame 1024 to the terminal A at the same time. That is, the relay station Y performs full-duplex communication of the data frames 1023 and 1024.

Here, the length (the time length) of the data frame 1023 transmitted from the access point X is same as the length of the data frame 1024 transmitted from the relay station Y. To obtain the same lengths, for example, a common value of the time length of a data frame may be set in advance in the relay station Y and the access point X. For example, at least one of the access point X and the relay station Y may notify the other of information about the time length of a data frame with a management frame. This notification may be given using not a management frame but a control frame or a data frame. Alternatively, the relay station Y may estimate the length of a data frame to be transmitted from the access point X, from the value in the Duration field of the RTS frame 1021, generate a data frame having a time length of the estimated value, and transmit the data frame. Alternatively, a new field may be added to the RTS frame 1021 such that the access point X gives a notification of the length of a data frame to be transmitted using the new field at a time of transmitting an RTS frame. The access point X can receive a signal of the data frame 1024 transmitted from the relay station Y to the terminal A. However, in this case, the access point X may discard the received data frame 1024, or may set an internal reception circuit not to receive any signal (for example, by disconnecting an antenna from the reception circuit) when the access point X is transmitting a frame.

When the relay station Y receives the data frame 1023 transmitted from the access point X, detects no frame error in FCS check, and determines that the relay station Y has succeeded in receiving the data frame 1023, the relay station Y transmits a delivery acknowledgement (which may be called simply acknowledgement) response frame (here, an ACK frame) 1025 to the access point X after elapse of an SIFS time since the reception. On the other hand, when the terminal A receives the data frame 1024 transmitted from the relay station Y, detects no frame error in FCS check, and determines that the terminal A has succeeded in receiving the data frame 1024, the terminal A transmits a delivery acknowledgement response frame (here, an ACK frame) 1026 to the relay station Y after elapse of an SIFS time since the reception. The length (time length) of each ACK frame is assumed to be fixed. Accordingly, the relay station Y transmits the ACK frame 1025 to the access point X and receives the ACK frame 1026 from the terminal A at the same time. That is, the relay station Y performs full-duplex communication of the ACK frames 1025 and 1026. The terminal A can receive the ACK frame 1025 transmitted from the relay station Y. However, in this case, the terminal A may discard the received ACK frame 1025, or may set an internal reception circuit not to receive any signal (for example, disconnect an antenna from the reception circuit) when the terminal A is transmitting a frame. In contrast, the terminal B fails to receive frames successfully because the terminal B receives the ACK frame 1025 transmitted from the relay station Y and the ACK frame 1026 transmitted from the terminal A at the same time, and the terminal B detects a frame error in FCS check.

A situation is considered where, after the completion of transmission and reception of the ACK frames 1025 and 1026, the access point X, at least either the relay station Y or the terminal A, and the terminal B perform carrier sense under CSMA/CA in order to acquire an transmission right for transmitting a frame, for example. Here, a situation where the access point X and the terminal A, and the terminal B perform carrier sense is assumed. As an example, a time for performing carrier sense starts at the time of completion of transmission and reception of the ACK frames 1025 and 1026, at which the busy state of a wireless medium is eliminated. For the access point X and the terminal A, the time length for performing carrier sense is the total time of a DIFS time and a randomly determined backoff time. The DIFS time is an example, and an AIFS time may be alternatively used. Another time (IFS) may also be used. Hereinafter, the same applies for the expression "DIFS time". In contrast, the terminal B uses not a DIFS time but an EIFS time which is longer than a DIFS time, and performs carrier sense during the total time of an EIFS time and a randomly determined backoff time. Here, the relationship EIFS time=SIFS time+ACK frame length+DIFS time is held.

The reason why the terminal B uses not a DIFS time but an EIFS time is that the terminal B detects a reception error (a frame error) due to simultaneous reception of the ACK frame 1025 and the ACK frame 1026, as described above. The IEEE 802.11 standard defines that, when a channel usage state is busy and an error (a reception error) is detected in a frame which causes the busy state, an EIFS time is used instead of a DIFS time in following CCA processing under CSMA/CA. The reasons why an EIFS time is used are as follows.

1. There is a possibility that a frame in which an error is detected is successfully received by other terminals (including a relay station and an access point).

2. When another terminal successfully receives the frame, the terminal transmits an ACK frame after elapse of an SIFS time since completion of reception of the frame.

3. Therefore, a corresponding channel is assumed to be busy during the total time of an SIFS time and an ACK frame length. The total time of an SIFS time and an ACK frame length corresponds to an ACK timeout period for a terminal which is a transmitter of the frame. When the transmitter terminal has received no ACK frame after elapse of an SIFS time since transmission of the frame, the transmitter terminal re-transmits the frame after elapse of the ACK timeout period.

4. For this reason, the terminal in which a reception error is detected waits for a period of an SIFS time and an ACK frame length, and then, performs normally carrier sense for a period of a DIFS time and a backoff time. That is, the terminal performs carrier sense for a period of an EIFS time (a total of an SIFS time, an ACK frame length, and a DIFS time) and a backoff time. This is schematically illustrated in FIG. 5(A).

In the example in FIG. 4, the terminal B receives two ACK frames 1025 and 1026 at the same time and detects a frame error. That is, the state of the channel is busy because two ACK frames 1025 and 1026 are received at the same time, and signals of the two ACK frames collide with each other and are not successfully decoded. As a result, a frame error is detected. In relation to FIG. 5(A), the ACK frames 1025 and 1026 are received in a period indicated as "busy" in FIG. 5(A), a time at which reception of the ACK frames is completed corresponds to an end time of the "busy" period. When the busy state of the channel is eliminated, the terminal B performs carrier sense for an EIFS time, and subsequently, performs carrier sense for a backoff time. When the carrier sense result (a CCA assessment value) shows "idle", the terminal B acquires a transmission right.

Figure 5:
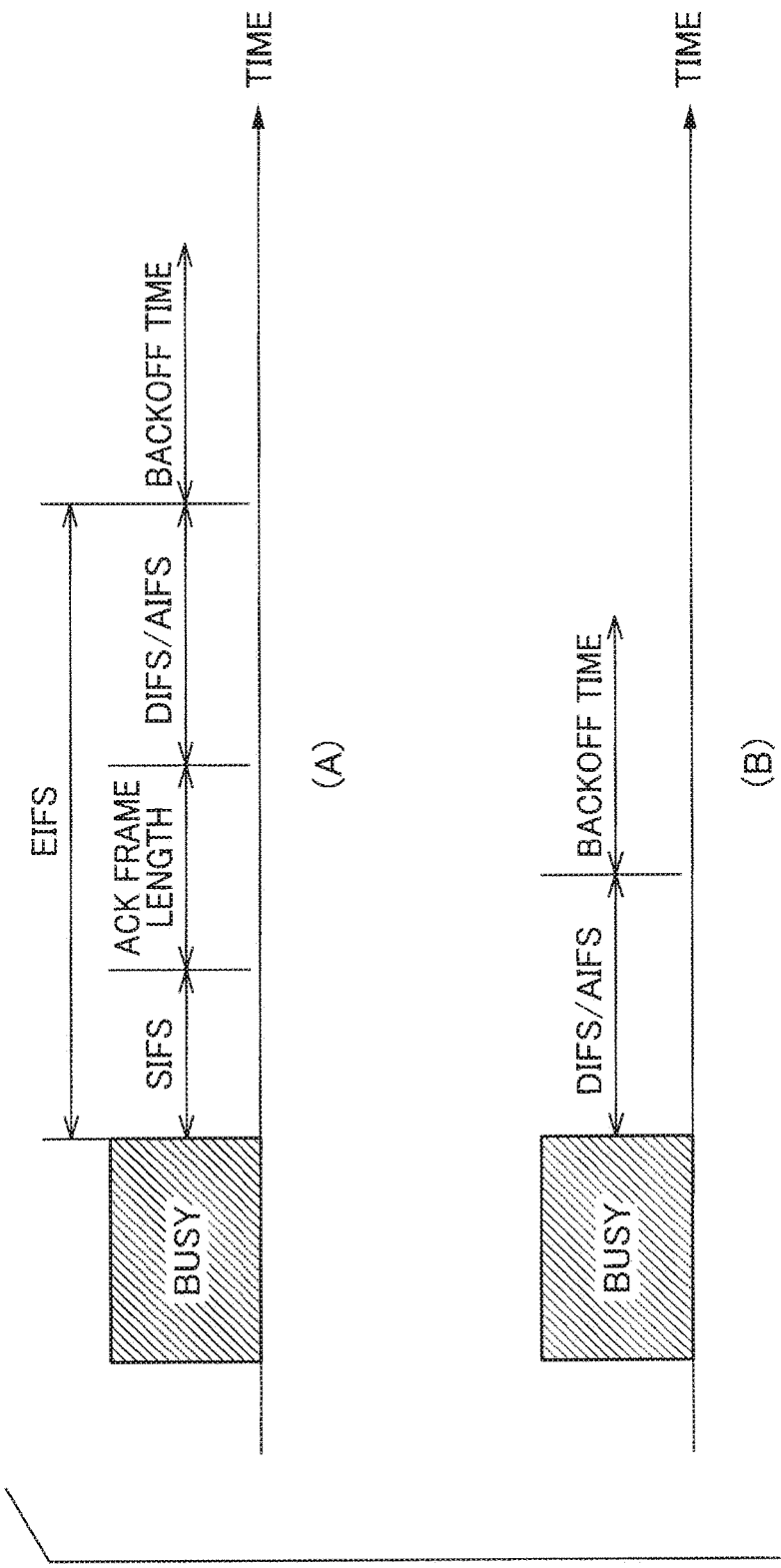
FIG. 5 is a diagram for explanation of a period in which carrier sense is performed.

On the other hand, as illustrated in FIG. 5(B), the access point X having received the ACK frame 1025 performs carrier sense for a DIFS time and a backoff time, and the terminal A having transmitted the ACK frame 1026 performs carrier sense for a DIFS time and a backoff time. When the carrier sense result (a result of CCA) is "idle", the access point X or the terminal A acquires a transmission rights.

Accordingly, in the relay station having performed full-duplex communication and the terminal and the access point having communicated with the relay station, respective fixed times for performing carrier sense prior to backoff in next CCA processing are DIFS times. In contrast, in the other terminal (the terminal B), a fixed time for carrier sense is an EIFS time. For this reason, in next processing for acquiring a transmission right, the terminal B necessarily loses to a terminal (here, the relay station) having performed full-duplex communication and terminals (here, the access point X and the terminal A) having communicated with the terminal, and fails to acquire a transmission right. This causes unequal opportunities for acquiring transmission/reception rights among the terminals (including the relay station and the access point).

One of the features of the relay station and the access point according to the present embodiment is to have, as a system for solving the above problem (an EIFS activation problem), a system for performing control so as to prevent a plurality of ACK frames in response to a plurality of frames having been full-duplex communicated from being transmitted at the same time.

Figure 6:
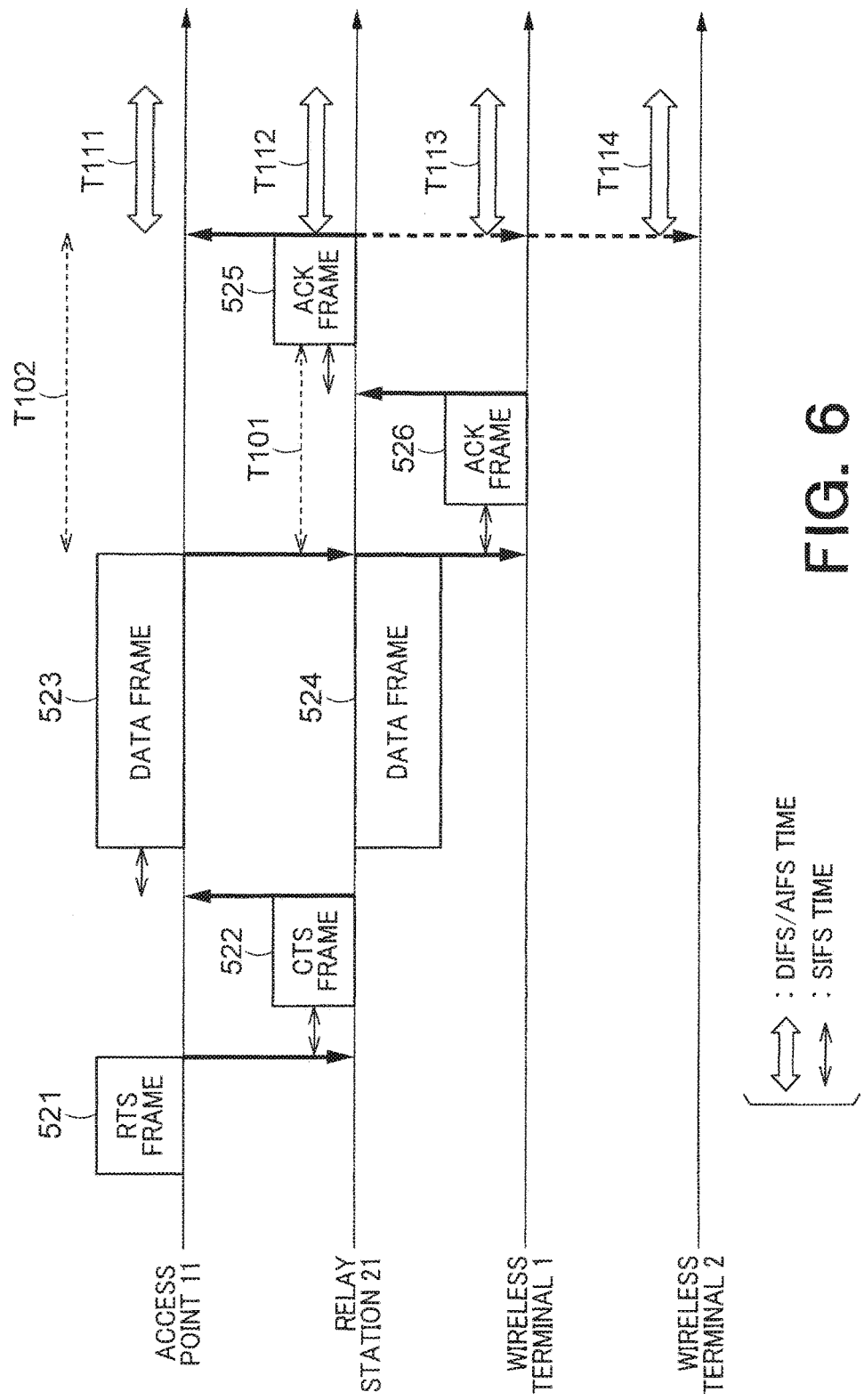
FIG. 6 is a diagram illustrating a first communication sequence example according to the embodiment.

FIG. 6 illustrates a first communication sequence example for solving the EIFS activation problem according to the present embodiment. In this example, the relay station 21 performs full-duplex communication of data frames on the basis of the second traffic pattern (see FIG. 3(B)). That is, the relay station 21 receives a data frame 523 from the access point 11 and transmits a data frame 524 to a terminal (here, the terminal 1) at the same time. One of the features in this sequence is that the relay station 21 having received the data frame 523 from the access point 11 returns an ACK frame 525 after elapse of a time T101 (that is, SIFS time+ACK frame length+SIFS time) which is a total of two times of an SIFS time and an ACK frame length. Another feature of the present sequence is that the access point 11 extends a timeout period for an ACK frame to be transmitted in response to the data frame 523 transmitted to the relay station 21, to be a time T102 which is two times a total time of an SIFS time and an ACK frame length, although a normal timeout period is a total time of an SIFS time and the length of an ACK frame length. The terminal 1 and the terminal 2 are each assumed to be a full-duplex incompatible terminal (for example, an existing terminal supporting the IEEE 802.11 standard). Hereinafter, the present sequence will be described in detail.

The access point 11 holding a frame to be transmitted performs CCA processing under CSMA/CA and acquires a transmission right to a wireless medium. That is, the access point 11 performs carrier sense for a period of a fixed time (here, a DIFS time) and a randomly determined backoff time, and determines that the wireless medium (CCA) is idle when detecting no reception signal having a level upper than a threshold, for example, and then, acquires a transmission right. In TXOP based on the acquired transmission right, the access point 11 transmits an RTS frame 521 to the relay station 21. The transmitter address (TA) of the RTS frame 521 is the address of the access point 11, and the receiver address (RA) of the RTS frame 521 is the relay station 21. In the Duration field of the RTS frame 521, a medium reservation time is set. As an example, a time required after completion of transmission of the RTS frame is calculated and the calculated value or larger is set. For example, a value of a time period from completion of transmission of the RTS frame to a time at which an SIFS time and an ACK frame length has elapsed since completion of transmission of the data frame 523 (that is, it is assumed that an ACK frame is received after elapse of an SIFS time since completion of transmission of the data frame 523) may be set.

The RTS frame 521 transmitted from the access point 11 is received by the relay station 21. The terminal 1 and the terminal 2 are assumed not to receive the RTS frame 521 (the terminal 1 and the terminal 2 are assumed to be outside the communication area of the access point 11). However, the terminal 1 and the terminal 2 may be allowed to receive the RTS frame 521.

The relay station 21 transmits a CTS frame 522 after elapse of an SIFS time since completion of reception of the RTS frame 521. The receiver address (RA) of the CTS frame 522 is the access point 11. A transmitter address (TA) is generally lacked. For example, in the Duration field of the CTS frame 522, information indicating a value smaller than a value (an expected value) which is obtained by subtracting an SIFS time and the frame length of the CTS frame 522 from the value in the Duration field of the RTS frame 521 is set. For example, a value indicating a time period from completion of transmission of the CTS frame 522 to completion of transmission of the data frame 524 (described later) is set. (here, it is assumed that a value is set in this way. Details of the setting and other setting examples will be described later.) The CTS frame 522 transmitted from the relay station 21 is received by the access point 11, the terminal 1, and the terminal 2. The terminal 1 and the terminal 2 set an NAV during a period set in the Duration field after completion of reception of the CTS frame 522 because the CTS frame 522 is not addressed to the terminal 1 or 2. The terminal 1 and the terminal 2 refrain from transmitting or wait to transmit a frame during a NAV set period (transmission restraint period).

The access point 11 having received the CTS frame 522 transmits the frame (here, a data frame) 523 after elapse of an SIFS time since completion of the reception. At the same time, the relay station 21 transmits the data frame 524 which has been held to be transmitted to the terminal 1. That is, the relay station 21 transmits the data frame 524 after elapse of an SIFS time since completion of transmission of the CTS frame 522. Accordingly, the relay station 21 receives the data frame 523 from the access point 11 and transmits the data frame 524 to the terminal 1 at the same time. That is, the relay station 21 performs full-duplex communication of the data frames. The receiver address (RA) of the data frame 523 is the relay station 21, and the transmitter address (TA) of the data frame 523 is the access point 11. When the final destination of the data frame 523 is a terminal different from the relay station 21, the address of the final destination terminal is also set in a corresponding Address field in the header of the data frame. The receiver address (RA) of the data frame 524 is the terminal 1, and the transmitter address (TA) of the data frame 524 is the relay station 21.

As an example, the length (time length) of the data frame 523 transmitted from the access point 11 is same as the length of the data frame 524 transmitted from the relay station 21. To obtain the same lengths, a common value as the time length of a data frame may be determined in advance in the relay station 21 and the access point 11. Such a value may be determined through communication of a management frame between the access point 11 and the relay station 21, or may be determined in advance in the system. Alternatively, the relay station 21 may estimate the length of a data frame to be transmitted from the access point 11, from the value in the Duration field of the RTS frame 521, and transmit a data frame having the time length of the estimated value. Alternatively, a new field may be added in the RTS frame 521 such that when transmitting the RTS frame, the access point 11 gives a notification of the length a data frame to be transmitted by using the new field. The access point 11 can receive the data frame 524 which is transmitted from the relay station 21 to the terminal 1, but may discard the data frame 524. Alternatively, the access point 11 may perform setting of the internal reception circuit not to receive any signal when the access point 11 is transmitting a frame.

When the terminal 1 having received the data frame 524 transmitted from the relay station 21 detects no frame error in FCS check and determines that reception of the data frame 524 has been succeeded, the terminal 1 transmits a delivery acknowledgement response frame (here, an ACK frame) 526 after elapse of an SIFS time since completion of the reception. At this time, an NAV has ended in the terminal 1 because the Duration value of the CTS frame 522 ends at a time of completion of transmission of the data frame 524, and thus, the terminal 1 can transmit the ACK frame because the terminal 1 has ended an NAV. If the Duration value of the CTS frame 522 matches the aforementioned expected value, it is in an NAV period, and the terminal 1 cannot transmit the ACK frame 526. On the other hand, when the relay station 21 having received the data frame 523 transmitted from the access point 11 detects no frame error in FCS check and determines that reception of the data frame 523 has been succeeded, the relay station 21 transmits an ACK frame 525 after elapse of a time T101 that is a total of two times of an SIFS time and an ACK frame length (that is, SIFS time+ACK frame length+SIFS time) since completion of reception of the data frame 523. In a normal case, the relay station 21 transmits an ACK frame after elapse of an SIFS time since completion of reception of the data frame 523. However, in this case, the relay station 21 extends a wait time before transmission of an ACK frame and transmits the ACK frame after elapse of the extended wait time T101 since completion of reception of the data frame 523. The respective lengths of the ACK frames transmitted from the terminals (including the relay station) are assumed to be fixed.

As described above, the relays station 21 transmits and receives the data frames 523 and 524 in a full-duplex manner but the relays station 21 sequentially transmits and receives the ACK frames 525 and 526 for responding to the data frames 523 and 524, respectively at time intervals of an SIFS time. That is, the relay station 21 delays a timing at which the relay station 21 transmits the ACK frame 525 to be later than a timing at which the terminal 1 transmits the ACK frame 526. Accordingly, the terminal 2 does not receive two ACK frames simultaneously, and succeeds in receiving the ACK frame 526 addressed to the relay station 21 and the ACK frame 525 addressed to the access point 11. Since the ACK frames 526 and 525 are not addressed to the terminal 2, the terminal 2 may discard the ACK frames.

Further, since the relay station 21 delays the timing for transmitting the ACK frame 525 to be later than the timing at which an SIFS has elapsed since completion of reception of the data frame 523, the ACK timeout period T102 of the access point 11 is set to be two times a total value of an SIFS time and an ACK frame length. That is, 2×(SIFS time+ACK frame length) is set. That is, the timeout period is set to be longer than the total time of an SIFS time and an ACK frame length, which is a typical ACK timeout period. The timeout period T102, which is extended in this way, is referred to as an extended ACK timeout period in some cases. That is, when the access point 11 transmits an RTS frame and receives a CTS frame as a response, the access point 11 controls an ACK timeout period on the basis of the relation between the Duration value of the CTS frame and an expected value. When the Duration value is smaller than the expected value, the access point 11 recognizes that the relay station 21 will perform not normal transmission and reception of frames but transmission and reception of frames through full-duplex communication, and extends the ACK timeout period. When the Duration value matches the expected value (or is higher than the expected value), the access point 11 does not change the ACK timeout period. In this way, when the Duration value is smaller than the expected value and the access point 11 does not receive an ACK frame after elapse of an SIFS time since transmission of the data frame 523, the access point 11 performs control to prevent ACK timeout at this time. That is, ACK timeout is not detected before elapse of the extended ACK timeout period T102 since completion of transmission of the data frame 523. Therefore, the access point 11 can successfully receive the ACK frame 525 which is transmitted from the relay station 21 after elapse of the time T101 (=SIFS time+ACK frame length+SIFS time) since completion of transmission of the data frame 523.

In order to obtain the ACK timeout period T102 of 2×(SIFS time+ACK frame length), a value to be set in the Duration field of the RTS frame 521 or the data frame 523 may be set according to the ACK timeout period T102. For example, in the Duration field of the data frame 523, a value may be set according to a time period from completion of transmission of the data frame 523 to completion of reception of the ACK frame 525 because the ACK timeout period is extended by considering the value in the Duration field of the CTS frame 522. In this way, the access point 11 can prevent a separate terminal in the communication area of the access point 11 from performing transmission for a period of 2×(SIFS time+ACK frame length), i.e., for the extended ACK timeout period T102 since completion of transmission of the data frame 523.

As described above, a value in the Duration field of the CTS frame 522 transmitted from the relay station 21 is set to be equal to or smaller than a time period from completion of transmission of the CTS frame 522 to start of transmission of the ACK frame 526 from the terminal 1. For example, the value is set to an SIFS time, (SIFS time+data frame length), or (SIFS time+data frame length+SIFS time). This can avoid a situation where, after elapse of an SIFS time since completion of reception of the data frame 524, the terminal 1 is unable to transmit the ACK frame 526 due to NAV which has been set according to the CTS frame 522. If a period indicated by the Duration value of the CTS frame 522 overlaps a period in which the ACK frame 526 is transmitted, it is determined by virtual carrier sense that it is in a NAV period and a wireless medium is busy, and thus, the ACK frame 526 may be unable to transmit the ACK frame 526. Therefore, in order to avoid the above situation, a value (a medium reservation time) obtained by calculation to end the NAV period before a time for starting transmission of the ACK frame 526 is set in the Duration field of the CTS frame 522. In this case, the access point 11 having received the CTS frame 522 determines that the Duration value of the CTS frame 522 is smaller than the expected value. When determining that the Duration value is smaller than the expected value in this way, the access point 11 may determine to extend a timeout period for an ACK frame. When the Duration value matches or is higher than the expected value, a normal timeout period at which a total of an SIFS time and an ACK frame length has elapsed since completion of transmission of the data frame 523 may be determined as a timeout period for an ACK frame.

For example, a situation where after completion of transmission of the ACK frames 525 and 526, the access point 11, the relay station 21, the terminal 1, and the terminal 2 perform CCA processing under CSMA/CA in order to acquire a transmission right to a wireless medium is considered. In the sequence example in FIG. 6, all of the access point 11, the relay station 21, the terminal 1, and the terminal 2 determine that the busy state of a wireless medium is eliminated by completion of transmission of the ACK frame 525, and start carrier sense. The access point 11, the relay station 21, the terminal 1, and the terminal 2 perform carrier sense for a total time of respective randomly-determined backoff periods and DIFS times T111, T112, T113, or T114, respectively. Unlike in the sequence example in FIG. 4, the terminal 2 (corresponding to the terminal B in FIG. 4) also starts not an EIFS time but a DIFS time as a fixed time prior to backoff. The reason for that is because a timing for the relay station 21 to transmit the ACK frame 525 is shifted behind so as not to overlap a timing for the terminal 1 to transmit the ACK frame 526, and thus, the terminal 2 can successfully decode the two ACK frames (detects no frame error). A transmission right is given to a terminal (which may be the relay station and the access point, in some cases) that completes carrier sense the earliest and determines that the wireless medium is idle, among the access point 11, the relay station 21, the terminal 1, and the terminal 2. The terminal having acquired the transmission right transmits a frame in a TXOP period based on the transmission right.

As described above, according to the sequence example in FIG. 6, a timing for the relay station 21 to transmit the ACK frame 525 is shifted behind so as not to overlap a timing for the terminal 1 to transmit the ACK frame 526, and thus, the terminal 2 does not detect a frame error caused by simultaneous reception of two ACK frames. Therefore, in CCA processing, the terminal 2 can use a fixed time (a DIFS time) same as those used by the terminal 1, the access point 11, and the relay station 21. In terms of an opportunity to acquire a transmission right, a disadvantage to the terminal 2 is accordingly prevented.

Figure 7:
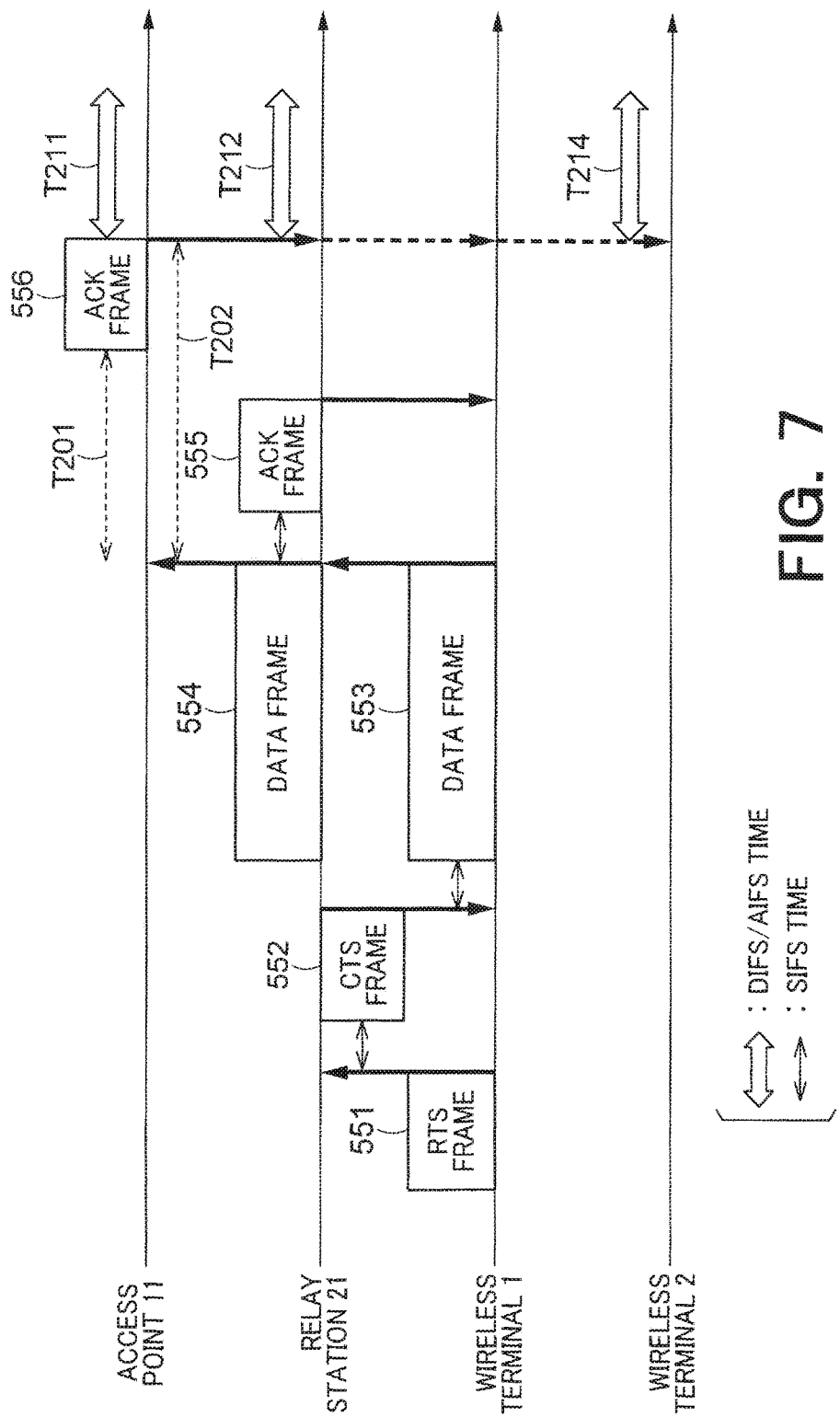
FIG. 7 is a diagram illustrating a second communication sequence example according to the embodiment.

FIG. 7 illustrates a second communication sequence example according to the present embodiment. In this example, the relay station 21 performs full-duplex communication of data frames on the basis of the first traffic pattern (see FIG. 3(A)). That is, the relay station 21 receives a data frame 553 from a terminal (here, the terminal 1) and transmits a data frame 554 to the access point 11 at the same time. One of the features in this sequence is that when the access point 11 receives a CTS frame addressed to a separate terminal from the relay station 21 and receives the data frame 554 addressed to the access point 11 from the relay station 21 after elapse of an SIFS time since the reception, the access point 11 considers that the relay station 21 will perform not normal transmission and reception of frames but transmission and reception of frames through full-duplex communication, and returns an ACK frame 556 to the relay station 21 after elapse of a time T201 (that is, SIFS time+ACK frame length+SIFS time) which is a total of two times of an SIFS time and an ACK frame length. That is, a wait time, which is an SIFS time in a normal case, from completion of reception of the data frame 554 to transmission of the ACK frame 556 is extended to the time T201. Thus, the ACK frame 556 is transmitted after elapse of the time T201. The terminal 1 and the terminal 2 are each a full-duplex incompatible terminal (for example, an existing terminal supporting the IEEE 802.11 standard). Hereinafter, the present sequence will be described in detail.

The terminal 1 holding a frame to be transmitted performs CCA processing under CSMA/CA and acquires a transmission right to a wireless medium. That is, when the terminal 1 performs carrier sense for a time period of a fixed time (here, a DIFS time) and a randomly determined backoff time and detects no reception signal having a level higher than a threshold, for example, the terminal 1 determines that a wireless medium (CCA) is idle and acquires a transmission right. In TXOP period based on the acquired transmission right, the terminal 1 transmits an RTS frame 551 to the relay station 21. The transmitter address (TA) of the RTS frame 551 is the address of the terminal 1, and the receiver address (RA) of the RTS frame 551 is the relay station 21. In the Duration field of the RTS frame 551, a medium reservation time required for the following communication is set. As an example, a time required after completion of transmission of the RTS frame is calculated and a value equal to or larger than the calculated value is set. Examples of this required time include a time required from completion of transmission of the RTS frame to completion of reception of an ACK frame 555 from the relay station 21.

The RTS frame 551 transmitted from the terminal 1 is received by the relay station 21. The RTS frame 551 may be further received by the terminal 2. It is assumed that RTS frame 551 is not received by the access point 11 by assuming that the access point 11 is outside the communication area.

The relay station 21 transmits a CTS frame 552 after elapse of an SIFS time since completion of reception of the RTS frame 551. The receiver address (RA) of the CTS frame 552 is the address of the terminal 1. A transmitter address (TA) is generally lacked. For example, in the Duration field of the CTS frame 552, a value obtained by subtracting an SIFS time and the frame length of the CTS frame 522 from the value in the Duration field of the RTS frame 551 is set. The CTS frame 552 is received by the terminal 1. The CTS frame 552 may be further received by the access point 11 and the terminal 2. In this case, the access point 11 and the terminal 2 set NAV for a period set in the Duration field since completion of reception of the CTS frame 552 because the CTS frame is not addressed to the access point 11 or the terminal 2.

The terminal 1 having received the CTS frame 552 transmits a frame (here, a data frame) 553 after elapse of an SIFS time since the reception. At the same time, the relay station 21 transmits a data frame 554 to the access point 11. That is, the relay station 21 transmits the data frame 554 after elapse of an SIFS time since completion of transmission of the CTS frame 552. Accordingly, the relay station 21 receives the data frame 553 from the terminal 1 and transmits the data frame 554 to the access point 11 at the same time. That is, the relay station 21 performs full-duplex communication of the data frames. It is assumed that the data frame 553 transmitted from the terminal 1 is not received by the access point 11 because the access point 11 is assumed to be outside the communication area. Accordingly, the access point 11 succeeds in receiving the data frame 554. The transmitter address (TA) of the data frame 553 is the address of the terminal 1, and the receiver address (RA) of the data frame 553 is the relay station 21. When the final destination of the data frame 553 is a terminal different from the relay station 21, the address of the final destination terminal may be also set in a corresponding Address field in the header of the data frame. The transmitter address (TA) of the data frame 554 is the address of the relay station 21, and the receiver address (RA) of the data frame 554 is the address of the access point 11 or a BSSID. When the final destination of the data frame 554 is a terminal different from the access point 11, the address of the final destination terminal may be also set in a corresponding Address field in the header of the data frame.

As an example, the length (time length) of the data frame 553 transmitted from the terminal 1 is same as the length of the data frame 554 transmitted from the relay station 21. To obtain the same lengths, a common value of the time length of a data frame may be set in advance in the relay station 21 and the access point 11. To determine the common value, a management frame may be communicated between the terminal 1 and the relay station 21, or the common value is determined in the system in advance. Alternatively, the length of a data frame transmitted from the terminal 1 may be estimated from the value (Duration value) in the Duration field of the RTS frame 551 such that the relay station 21 generates and transmits a data frame having a time length of the estimated value. Alternatively, a new field may be added to the RTS frame 551, and the terminal 1 may give a notification of the length of a data frame to be transmitted using the new field when transmitting the RTS frame. When the length of a data frame to be transmitted is shorter than the common value, the relay station 21 and the terminal 1 each may add padding data to the end of the frame. The terminal 1 can receive the data frame 554 which is transmitted from the relay station 21 and is addressed to the access point 11. However, the terminal 1 may discard the data frame 554, or may set an internal reception circuit not to receive any signal when the terminal 1 is transmitting a frame.

When the relay station 21 having received the data frame 553 transmitted from the terminal 1 detects no frame error in FCS check and determines that reception of the data frame 553 has succeeded, the relay station 21 transmits a delivery acknowledgement response frame (here, an ACK frame) 555 to the terminal 1 after elapse of an SIFS time since completion of the reception. On the other hand, when the access point 11 having received the data frame 554 transmitted from the relay station 21 detects no frame error in FCS check and determines that reception of the data frame 554 has succeeded, the access point 11 transmits an ACK frame 556 to the relay station 21 after elapse of the time T201 which is a total of two times of an SIFS time and an ACK frame length (that is, SIFS time+ACK frame length+SIFS time) since completion of reception of the data frame 554. More specifically, when the access point 11 receives the CTS frame 552 addressed to a separate terminal and receives the data frame 554 addressed to the access point 11 after elapse of an SIFS time since the reception, the access point 11 transmits an ACK frame not after elapse of an SIFS time but after elapse of the time T201 (SIFS time+ACK frame length+SIFS time) obtained by extending an SIFS time. An ACK frame length is assumed to be fixed. The time T201 is longer than a time period from the end of the data frame 553 to the start of ACK frame 555.

As described above, the relay station 21 transmits and receives the data frames 553 and 554 in a full-duplex manner but sequentially transmits and receives the ACK frames 555 and 556 for responding to the data frames 553 and 554, respectively, at time intervals of an SIFS time. For this reason, the access point 11 delays a timing at which the access point 11 transmits the ACK frame 556 to be later than a timing at which the relay station 21 transmits the ACK frame 555 so as not to overlap the time period for the ACK frame 555. Accordingly, even when the terminal 2 can receive a signal from the access point 11, an error caused by simultaneous reception of two ACK frames does not occur in the terminal 2.

Since a timing for the access point 11 to transmit the ACK frame 556 is shifted behind a timing at which an SIFS time has elapsed since completion of reception of the data frame 554, the ACK timeout period T202 in the relay station 21 is set to be two times a total of an SIFS time and an ACK length. That is, 2×(SIFS time+ACK frame length) is set. That is, the timeout period is extended to be longer than the total time of an SIFS time and an ACK frame length, which is a typical ACK timeout period. The timeout period T202, which is extended in this way, is referred to as an extended ACK timeout period in some cases. In this way, even when the relay station 21 does not receive an ACK frame after elapse of an SIFS time since transmission of the data frame 554, ACK timeout does not occur at this time, and ACK timeout is not detected for the extended ACK timeout period T202 since completion of transmission of the data frame 554. Therefore, the relay station 21 can successfully receive the ACK frame 556 which is transmitted from the access point 11 after elapse of the period T201 (=SIFS+ACK frame length+SIFS time) since completion of transmission of the data frame 554.

As an example, a value in the Duration field of the CTS frame 552 transmitted from the relay station 21 is set to be a value equal to or smaller than the time length from completion of transmission of the CTS frame 552 to completion of transmission of the ACK frame 556 from the access point 11. As a specific example, (SIFS time+data frame length+SIFS time+ACK frame length+SIFS time+ACK frame length) is set. Even when a time period at which the time T201 has elapsed since completion of reception of the data frame 554 is in an NAV period which is set according to the CTS frame 552, the access point 11 is assumed to be able to transmit the ACK frame 556 because the access point 11 is a full-duplex compatible terminal. The value in the Duration field is set to be a time length from completion of transmission of the CTS frame 552 to completion of transmission of the ACK frame 556, thereby suspending transmission from the terminal 2 until completion of transmission of the ACK frame 556.

For example, a situation where after completion of transmission and reception of the ACK frames 555 and 556, the access point 11, the relay station 21, and the terminal 2 perform CCA processing under CSMA/CA in order to acquire a transmission right to a wireless medium is considered. In the sequence example in FIG. 7, all of the access point 11, the relay station 21, and the terminal 2 determine that the busy state of a wireless medium is eliminated by completion of transmission of the ACK frame 556, and start carrier sense. The access point 11, the relay station 21, and the terminal 2 perform carrier sense for a total time of respective randomly-determined backoff period and a DIFS time T211, T212, or T214, respectively. Unlike in the sequence example in FIG. 4, the terminal 2 (corresponding to the terminal B in FIG. 4) also starts not an EIFS time but a DIFS time as a fixed time prior to backoff. The reason for that is because a timing for the access point 11 to transmit the ACK frame 556 is shifted behind so as not to overlap a timing for the relay station 21 to transmit the ACK frame 555, and thus, the terminal 2 does not detect a frame error caused by simultaneous reception of two ACK frames. A transmission right is given to a terminal (which may be the relay station or the access point in some cases) that completes carrier sense the earliest and determines that the wireless medium is idle. The terminal having acquired the transmission right transmits a frame in TXOP period based on the transmission right. If the terminal 1, which is located at a position at which the terminal 1 cannot receive the ACK frame 556, tries to acquire a transmission right after receiving the ACK frame 555, the terminal 1 performs CCA processing after completion of reception of the ACK frame 555.

When the terminal 2 receives the data frame 553 transmitted from the terminal 1 and receives the data frame 554 transmitted from the relay station 21 at the same time, the terminal 2 detects a frame error so that a condition for starting an EIFS time is established. However, when the terminal 2 subsequently succeeds in receiving the ACK frame 555 or the ACK frame 556, the condition for starting an EIFS time is eliminated.

As described above, according to the sequence example in FIG. 7, a timing for the access point 11 to transmit the ACK frame 556 is shifted behind so as not to overlap the time period in which the relay station 21 transmits the ACK frame 555 so that the terminal 2 can be prevented from receiving two ACK frames simultaneously. Accordingly, also in the following CCA processing, the terminal 2 can use a fixed time (a DIFS time) same as those used by the terminal 1, the access point 11, and the relay station 21, without actuating an EIFS time. In terms of an opportunity to acquire a transmission right, a disadvantage to the terminal 2 is accordingly prevented.

Figure 8:
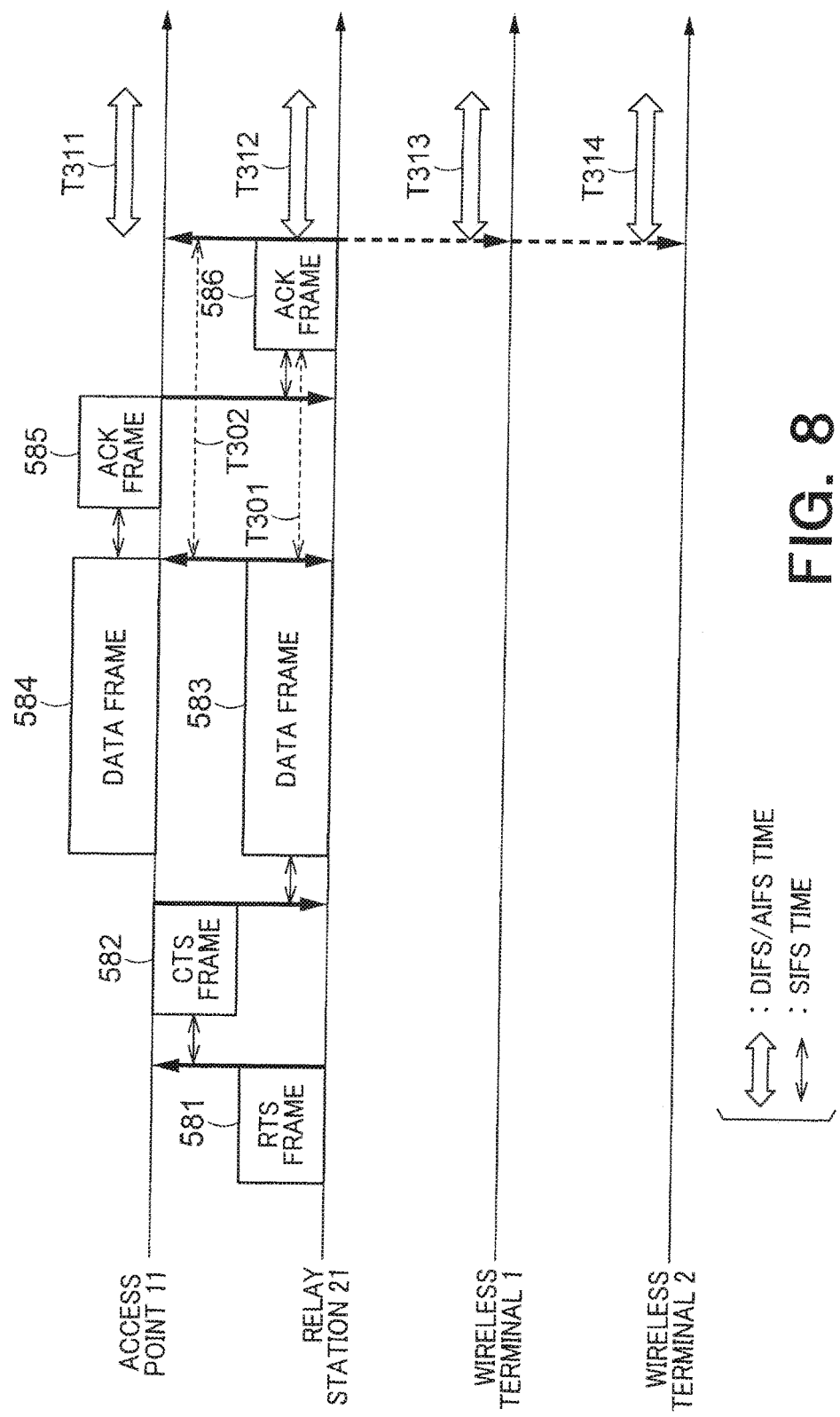
FIG. 8 is a diagram illustrating a third communication sequence example according to the embodiment.

FIG. 8 illustrates a third communication sequence example according to the present embodiment. In this example, the access point 11 and the relay station 21 perform full-duplex communication of data frames on the basis of the third traffic pattern (see FIG. 3(C)). That is, the access point 11 transmits a data frame 584 to the relay station 21 and receives a data frame 583 from the relay station 21 at the same time. The relay station 21 receives the data frame 584 from the access point 11 and transmits the data frame 583 to the access point 11 at the same time. One of the features in the present sequence is that the relay station 21 returns an ACK frame 586 after elapse of a time T301 (that is, SIFS time+ACK frame length+SIFS time) which is a total of two times of an SIFS time and an ACK frame length since completion of reception of the data frame 584 from the access point 11. Another feature in the present sequence is that the access point 11 extends a timeout period for an ACK frame for responding to the data frame 584 to be a total time of two times of an SIFS time and two times of an ACK frame length. The terminal 1 and the terminal 2 are each assumed to be a full-duplex incompatible terminal (for example, an existing terminal supporting the IEEE 802.11). Hereinafter, the present sequence will be described in detail.

The relay station 21 holding a frame to be transmitted performs CCA processing under CSMA/CA and acquires a transmission right to a wireless medium. That is, when the relay station 21 performs carrier sense for a time period of a fixed time (here, a DIFS time) and a randomly determined backoff time and detects no reception signal having a level equal to or higher than a threshold, for example, the relay station 21 determines that a wireless medium (CCA) is idle and acquires a transmission right. In TXOP period based on the acquired transmission right, the relay station 21 transmits an RTS frame 581 to the access point 11. The transmitter address (TA) of the RTS frame 581 is the address of the relay station 21, and the receiver address (RA) of the RTS frame 581 is the address of the access point 11 or a BBSID. In the Duration field of the RTS frame 581, a medium reservation time is set. As an example, a time required for communication following transmission of the RTS frame is calculated and the calculated value is set. Examples of this required time include a time required from completion of transmission of the RTS frame 581 to completion of reception of an ACK frame 585 from the access point 11, or a time required from completion of transmission of the RTS frame 581 to completion of transmission of an ACK frame 586 to the access point 11.

The RTS frame 581 transmitted from the relay station 21 is received by the access point 11. The RTS frame 581 is further received by the terminal 1 and the terminal 2. The terminal 1 and the terminal 2 set NAV on the basis of the Duration field of the RTS frame 581. Even when the terminal 1 and the terminal 2 do not receive the RTS frame 581, the present sequence can be performed.

The access point 11 transmits a CTS frame 582 after elapse of an SIFS time since completion of reception of the RTS frame 581. The receiver address (RA) of the CTS frame 582 is the address of the relay station 21. A transmitter address (TA) is generally lacked. For example, in the Duration field of the CTS frame 582, a value obtained by subtracting an SIFS time and the frame length of the CTS frame 582 from the value in the Duration field of the RTS frame 581 is set. The CTS frame 582 is received by the relay station 21. The CTS frame 582 may be further received by the terminal 1 and the terminal 2, depending on the positions of the terminal 1 and the terminal 2. In this case, the terminal 1 and the terminal 2 set (update) NAV on the basis of the Duration field of the CTS frame 582.

The relay station 21 having received the CTS frame 582 transmits the frame (here, a data frame) 583 to the access point 11 after elapse of an SIFS time since completion of reception of the CTS frame 582. On the other hand, the access point 11 transmits the data frame 584 after elapse of an SIFS time since completion of transmission of the CTS frame 582. Accordingly, the relay station 21 transmits the data frame 583 and receives the data frame 584 at the same time and the access point 11 transmits the data frame 584 and receives the data frame 583 at the same time. That is, the access point 11 and the relay station 21 each perform full-duplex communication of the data frames. The transmitter address (TA) of the data frame 583 is the address of the relay station 21, and the receiver address (RA) of the data frame 583 is the access point 11. When the final destination of the data frame 583 is a terminal different from the access point 11, the address of the final destination terminal may be also set in a corresponding Address field in the header of the data frame. The transmitter address (TA) of the data frame 584 is the address of the access point 11 or a BSSID, and the receiver address (RA) of the data frame 584 is the address of the relay station 21. When the final destination of the data frame 584 is a terminal different from the relay station 21, the address of the final destination terminal may be also set in a corresponding Address field in the header of the data frame.

As an example, the length (time length) of the data frame 583 transmitted from the relay station 21 is same as the length of the data frame 584 transmitted from the access point 11. To obtain the same lengths, a common value as the time length of a data frame may be determined in advance in the relay station 21 and the access point 11. To determine the common value, a management frame may be communicated between the access point 11 and the relay station 21 in advance. Alternatively, the common value may be determined in advance in the system. Alternatively, from the value in the Duration field of the RTS frame 581, the access point 11 may calculate the length of a data frame transmitted from the relay station 21, and generate and transmit a data frame having the calculated time length. In other cases, a new field may be added in the RTS frame 581 such that when transmitting the RTS frame, the relay station 21 gives a notification of a data frame length transmitted by using the new field.

When the access point 11 having received the data frame 583 transmitted from the relay station 21 detects no frame error in FCS check and determines that reception of the data frame 583 has succeeded, the access point 11 transmits a delivery acknowledgement response frame (ACK frame) 585 to the relay station 21 after elapse of an SIFS time since completion of the reception. On the other hand, the relay station 21 having received the data frame 584 transmitted from the access point 11 detects no frame error in FCS check and determines that reception of the data frame 584 has succeeded, the relay station 21 waits to transmit an ACK frame for a time period (that is, SIFS time+ACK frame length+SIFS time) T301 which is a total of two times of an SIFS time and an ACK frame length since completion of reception of the data frame 584, and transmits the ACK frame 586 to the access point 11 after elapse the time T301. That is, when the relay station 21 receives the CTS frame 582 in response to the transmitted RTS frame 581 and receives the data frame 584 addressed to the relay station 21 after elapse of an SIFS time since the reception, the relay station 21 transmits the ACK frame 586 not after elapse of an SIFS time but after elapse of the time T301 which is a total of two times of an SIFS time and an ACK frame length. The lengths of ACK frames transmitted from the access point 11 and the relay station 21 are assumed to be fixed.

As described above, the relay station 21 transmits and receives the data frames 583 and 584 in a full-duplex manner but sequentially transmits and receives the ACK frames 586 and 585 for responding to the data frames 583 and 584, respectively, at time intervals of an SIFS time. That is, the relay station 21 delays a timing at which the relay station 21 transmits the ACK frame 586 to be later than a timing at which the access point 11 transmits the ACK frame 585 so as not to overlap the time period for the ACK frame 585. Accordingly, even when the terminal 1 and the terminal 2 can receive a signal from the access point 11, a frame error caused by simultaneous reception of two ACK frames from both the relay station 21 and the access point 11 is prevented from occurring. The ACK frames 585 and 586 are not addressed to the terminal 1 or the terminal 2. Thus, when receiving the ACK frames, the terminal 1 and the terminal 2 discard the ACK frames.

Since a timing for the relay station 21 to transmit the ACK frame 586 is shifted behind a timing at which an SIFS time has elapsed since completion of reception of the data frame 584, the ACK timeout period T302 in the access point 11 is set to be twice a total of an SIFS time and an ACK frame length. That is, 2×(SIFS time+ACK frame length) is set. That is, the timeout period is extended to be longer than the total time of an SIFS time and an ACK frame length, which is a typical ACK timeout period. The ACK timeout period, which is extended in this way, is referred to as an extended ACK timeout period in some cases. That is, when the access point 11 transmits the CTS frame 582 in response to the received RTS frame 581 and transmits the data frame 584 to a reception destination terminal (here, the relay station) same as that of the CTS frame 582 after elapse of an SIFS time, the access point 11 extends the ACK timeout period for the data frame 584. For this reason, even when the access point 11 does not receive an ACK frame after elapse of an SIFS time since transmission of the data frame 584, ACK timeout does not occur at this time. ACK timeout is not detected before elapse of the extended ACK timeout period T302 since completion of transmission of the data frame 584. Therefore, the access point 11 can successfully receive the ACK frame 586 which is transmitted from the access point 11 after elapse of the period T301 (=SIFS time+ACK frame length+SIFS time) since completion of transmission of the data frame 584.

For example, a situation where after completion of transmission of the ACK frames 585 and 586, the access point 11, the relay station 21, the terminal 1, and the terminal 2 perform CCA processing under CSMA/CA in order to acquire a transmission right to a wireless medium is considered. In the sequence example in FIG. 8, all of the access point 11, the relay station 21, the terminal 1, and the terminal 2 determine that the busy state of a wireless medium is eliminated by completion of transmission of the ACK frame 586, and start carrier sense. The access point 11, the relay station 21, the terminal 1, and the terminal 2 perform carrier sense for a total time (a wait time) of respective randomly-determined backoff period and DIFS times T311, T312, T313, or T314, respectively. The terminal 1 and the terminal 2, which are not designated to perform full-duplex communication, also start not an EIFS time but a DIFS time as a fixed time prior to backoff. The reason for that is because a timing for the relay station 21 to transmit the ACK frame 586 is shifted behind so as not to overlap a timing for the access point 11 to transmit the ACK frame 585, and thus, the terminal 1 and the terminal 2 can each successfully receive the two ACK frames (detect no frame error). A terminal (which may be the relay station or the access point in some cases) that completes carrier sense the earliest and determines that the wireless medium is idle acquires a transmission right, and transmits a frame in TXOP period based on the transmission right.

When the terminal 1 and the terminal 2 receive the data frame 584 transmitted from the access point 11 and the data frame 583 transmitted from the relay station 21 at the same time, the terminal 1 and the terminal 2 detect frame errors and a condition for starting an EIFS times is established. However, when the terminals 1 and 2 subsequently succeed in receiving the ACK frame 585 or the ACK frame 586, the condition for starting EIFS times is eliminated.

As described above, according to the sequence example in FIG. 8, a timing for the relay station 21 to transmit the ACK frame 586 is shifted behind so as not to overlap the time period in which the access point 11 transmits the ACK frame 585 so that each of the terminals 1 and 2 can be prevented from receiving the two ACK frames simultaneously. Accordingly, in the following CCA processing, the terminal 1 and the terminal 2 can use a DIFS time as a fixed time prior to backoff of carrier sense, without actuating an EIFS time. In terms of an opportunity to acquire a transmission right, disadvantages to the terminal 1 and the terminal 2, which are not designated to perform full-duplex communication, are accordingly prevented.

In the sequence in FIG. 8, the timing at which the relay station 21 transmits an ACK frame is delayed. However, the relay station 21 may transmit an ACK frame after elapse of an SIFS time since completion of reception of the data frame 584 and delay the timing at which the access point 11 transmits an ACK frame. That is, the access point 11 may transmit an ACK frame after elapse of the time T301 since completion of transmission of the data frame 584. In this case, the relay station 21 may use an extended ACK timeout period as the ACK timeout period for the data frame 583. Further, in the sequence in FIG. 8, the relay station 21 transmits an RTS frame as the start of the sequence. However, the access point may transmit an RTS frame at the start of the sequence.

In the sequence examples in FIGS. 6 to 8, a plurality of data frames are communicated in a full-duplex manner. Each data frame may be formed by connecting a plurality of MAC frames or a plurality of payloads of MAC frames. In the IEEE 802.11 standard, the former is called "A(Aggregated)-MPDU", and the latter is called "A(Aggregated)-MSDU (MAC service data unit)". For A-MPDU, responses to a plurality of MAC frames are transmitted together. Thus, BA (Block ACK) frames are used as delivery acknowledgement response frames, instead of ACK frames. Not only data frames but also management frames and control frames may be connected.

Figure 9:
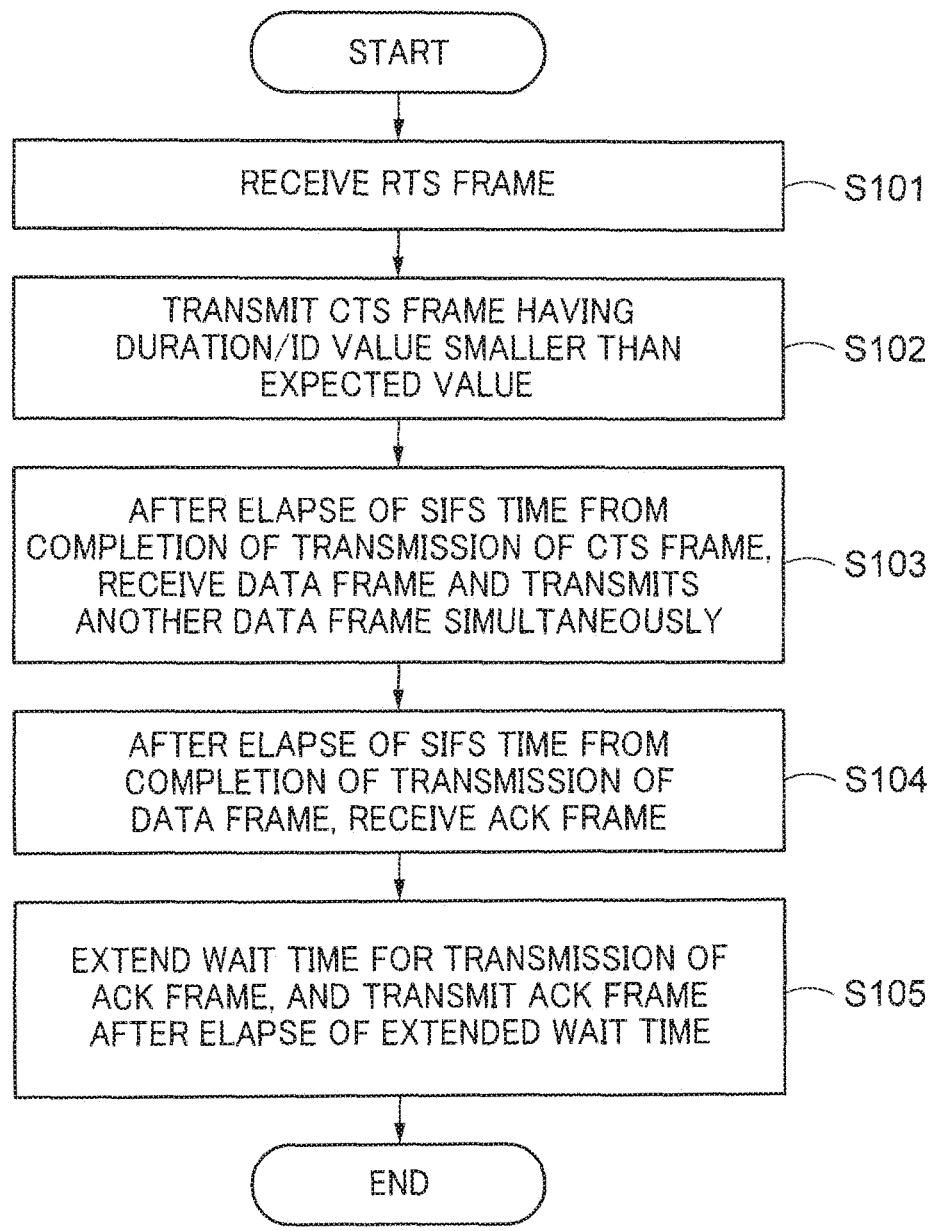
FIG. 9 is a diagram showing a flowchart example of operations of the relay station according to the embodiment.

FIG. 9 shows a flowchart example of the operation of the relay station 21 according to the present embodiment. This operation of the relay station 21 corresponds to the relay station 21 in the sequence example in FIG. 6. The relay station 21 receives the RTS frame 521 from the access point 11 (S101), and returns the CTS frame 522 (S102). The value in the Duration field of the CTS frame 522 is set to a value smaller than an expected value (for example, a value obtained by subtracting an SIFS time and the length of the CTS frame from the value in the Duration field of the RTS frame). After elapse of an SIFS time since completion of transmission of the CTS frame 522, the relay station 21 receives the data frame 523 from the access point 11 and transmits the data frame 524 to the terminal 1 at the same time (S103). After elapse of an SIFS time since completion of transmission of the data frame 524, the relay station 21 receives the ACK frame 526 from the terminal 1 (S104). The relay station 21 extends a wait time for transmitting an ACK frame in response to the data frame 523 from an SIFS time to the time T101 which is a total of two times of an SIFS time and an ACK frame length, and returns the ACK frame 525 to the access point 11 after elapse of the extended wait time T101 (S105).

Figure 10:
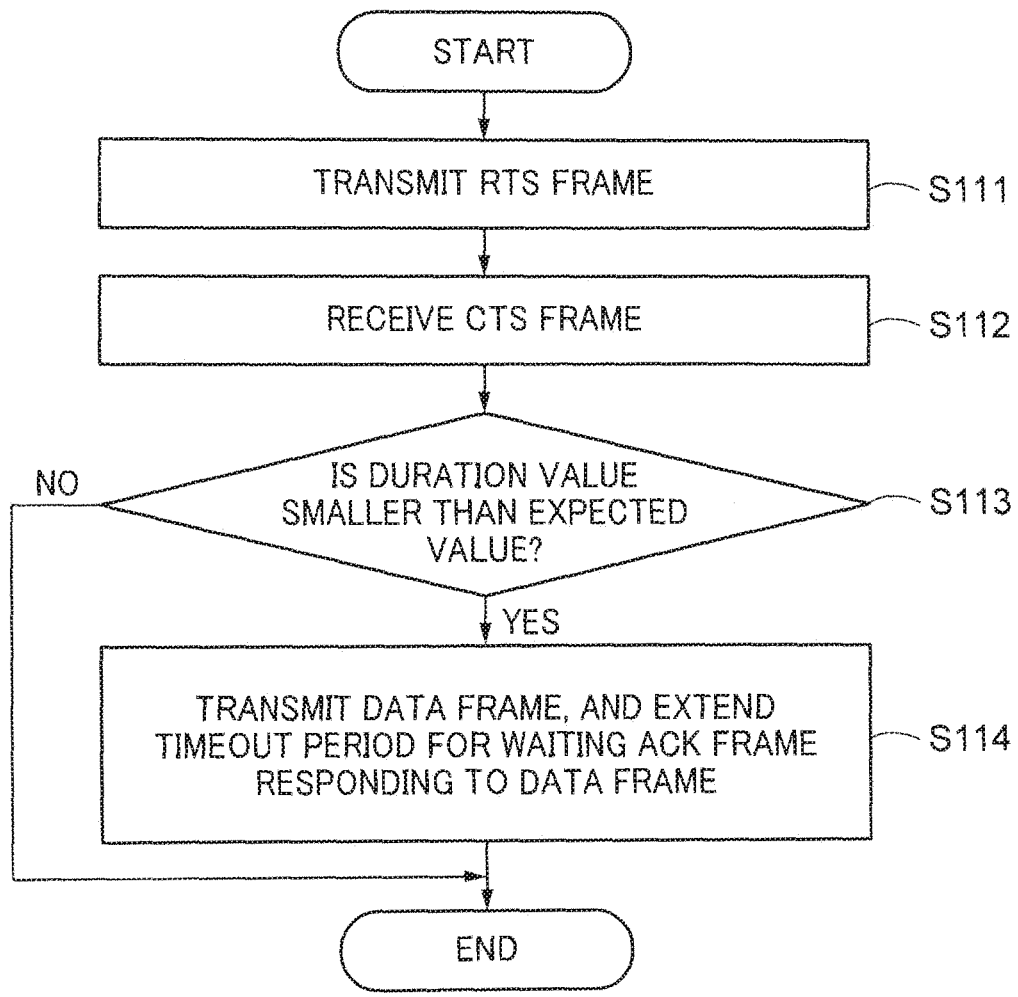
FIG. 10 is a diagram showing a flowchart example of operations of the access point according to the embodiment.

FIG. 10 shows a flowchart example of the operation of the access point 11 according to the present embodiment. This operation of the access point 11 corresponds to the operation of the access point 11 in the sequence example in FIG. 6. The access point 11 transmits the RTS frame 521 (S111), and receives the CTS frame 522 (S112). The access point 11 determines whether the value in the Duration field of the CTS frame 522 is smaller than an expected value (S113). When the value is smaller than the expected value, the access point 11 extends a timeout period for an ACK frame after transmitting the data frame 523 (S114). For example, a normal timeout period is a total time of an SIFS time and an ACK frame length. However, the access point 11 extends the timeout period to two times of the above total time. Subsequently, the access point 11 waits to receive the ACK frame 525 from the relay station 21 for the extended time period. When the value in the Duration field of the CTS frame 522 matches or is larger than the expected value, the access point 11 normally waits to receive an ACK frame from the relay station 21 for a time period which is a total of an SIFS time and an ACK frame length, after transmitting the data frame 523.

Figure 11:
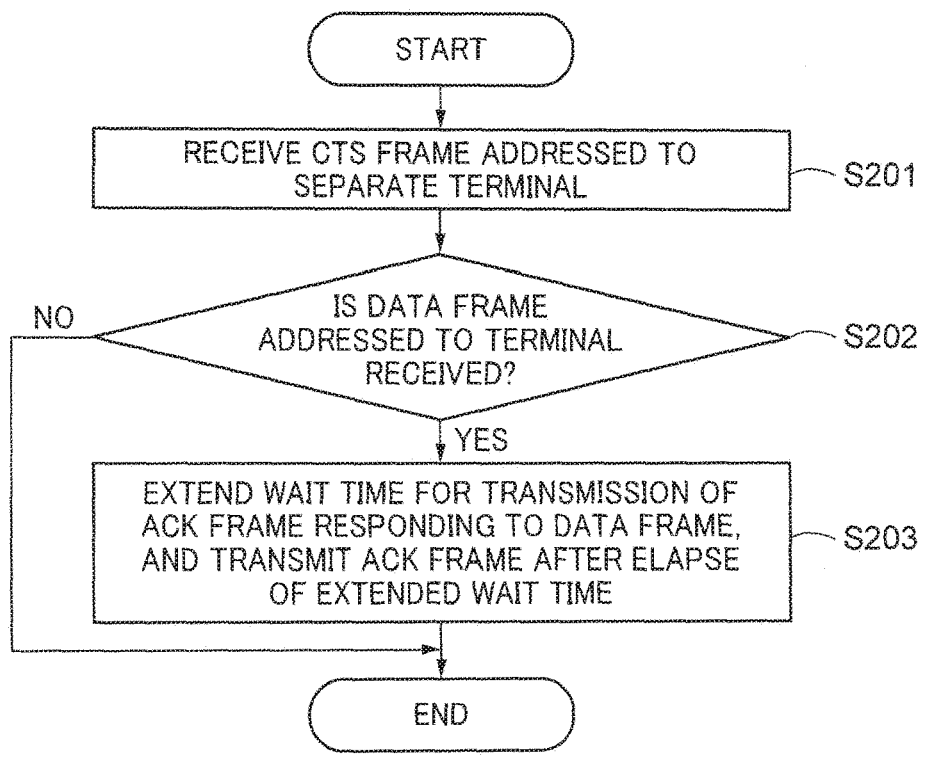
FIG. 11 is a diagram showing a flowchart example of operations of the access point according to the embodiment.

FIG. 11 shows a flowchart example of the operation of the access point 11 according to the present embodiment. This operation of the access point 11 corresponds to the operation of the access point 11 in the sequence example in FIG. 7. The access point 11 receives the CTS frame 552 addressed to a separate terminal from the relay station 21 (S201), and determines, after elapse of an SIFS time since the reception, whether the access point 11 has received the data frame 554 addressed to the access point 11 (S202). When the access point 11 has received the data frame 554 addressed to the access point 11, the access point 11 extends a wait time for transmitting an ACK frame in response to the data frame 554 from an SIFS time to the time T201 which is a total time of two times of an SIFS time and an ACK frame, waits for the extended wait time T201, and then, transmits the ACK frame 556 (S203).

Figure 12:
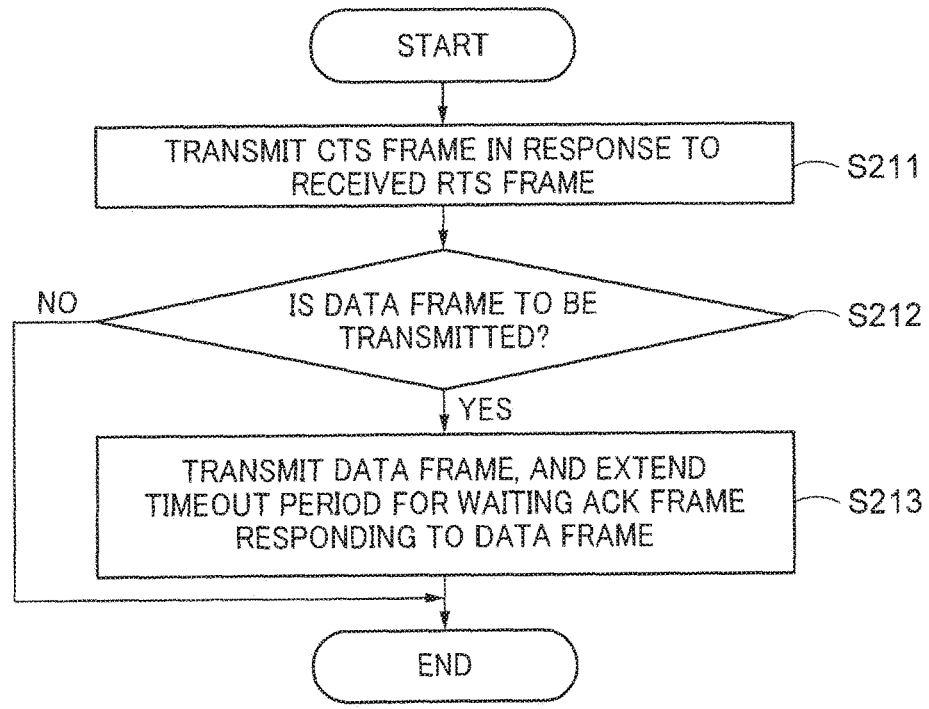
FIG. 12 is a diagram showing a flowchart example of operations of the relay station according to the embodiment.

FIG. 12 shows a flowchart example of the operation of the relay station 21 according to the present embodiment. This operation of the relay station 21 corresponds to the relay station 21 in the sequence example in FIG. 7. The relay station 21 transmits the CTS frame 552 in response to the received RTS frame 551 (S211), and receives the data frame 553 after elapse of an SIFS time since completion of transmission of the CTS frame 552. When the relay station 21 receives the data frame 553 and transmits the data frame 554 to the access point 11 at that time, that is, when the relay station 21 transmits the data frame 554 after elapse of an SIFS time since completion of transmission of the CTS frame 552 (YES at S212), the relay station 21 extends a timeout period for an ACK frame during which the relay station 21 waits after transmitting the data frame 554 (S213). More specifically, although a normal timeout period is a total time of an SIFS time and the length of an ACK frame, the timeout period is extended to two times this total time. The relay station 21 transmits the ACK frame 555 after elapse of an SIFS time since completion of reception of the data frame 553. Further, the relay station 21 waits to receive the ACK frame 556 from the access point 11 for the extended timeout period after transmitting the data frame 554.

Figure 13:
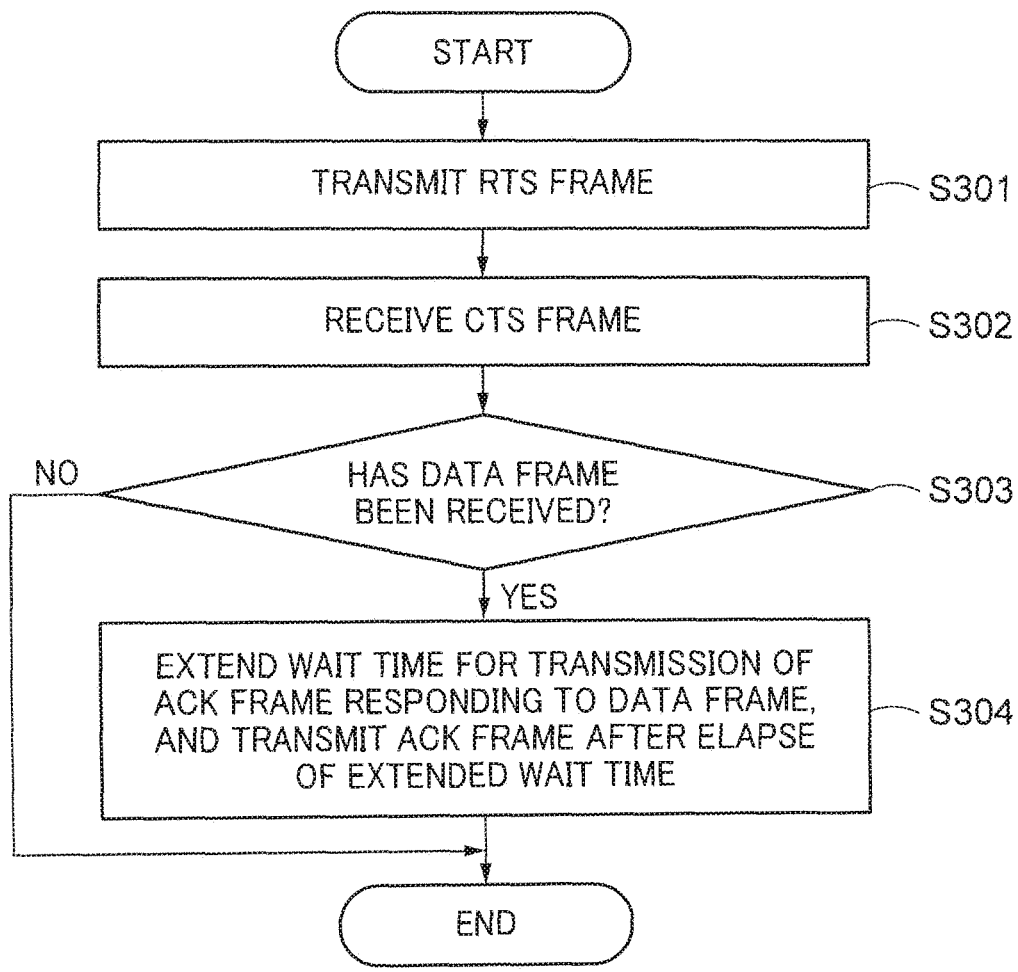
FIG. 13 is a diagram showing a flowchart example of operations of the relay station according to the embodiment.

FIG. 13 shows a flowchart example of the operation of the relay station 21 according to the present embodiment. This operation of the relay station 21 corresponds to the relay station 21 in the sequence example in FIG. 8. The relay station 21 transmits the RTS frame 581 (S301), and receives the CTS frame 582 as a response to the RTS frame 581 (S302). The relay station 21 transmits the data frame 583 after elapse of an SIFS time since completion of reception of the CTS frame 582. The relay station 21 determines whether the relay station 21 has received the data frame 584 from the access point 11 which is the reception destination of the RTS frame 581, simultaneously with the transmission of the data frame 583 (S303). When the relay station 21 has received the data frame 584, the relay station 21 extends a wait time for transmitting an ACK frame from an SIFS time to the time T301 which is a total of two times of an SIFS time and the length of an ACK frame. The relay station 21 receives the ACK frame 585 after elapse of an SIFS time since completion of transmission of the data frame 583. Further, the relay station 21 waits for the extended wait time T301 after receiving the data frame 584, and then, transmits the ACK frame 586 (S304).

Figure 14:
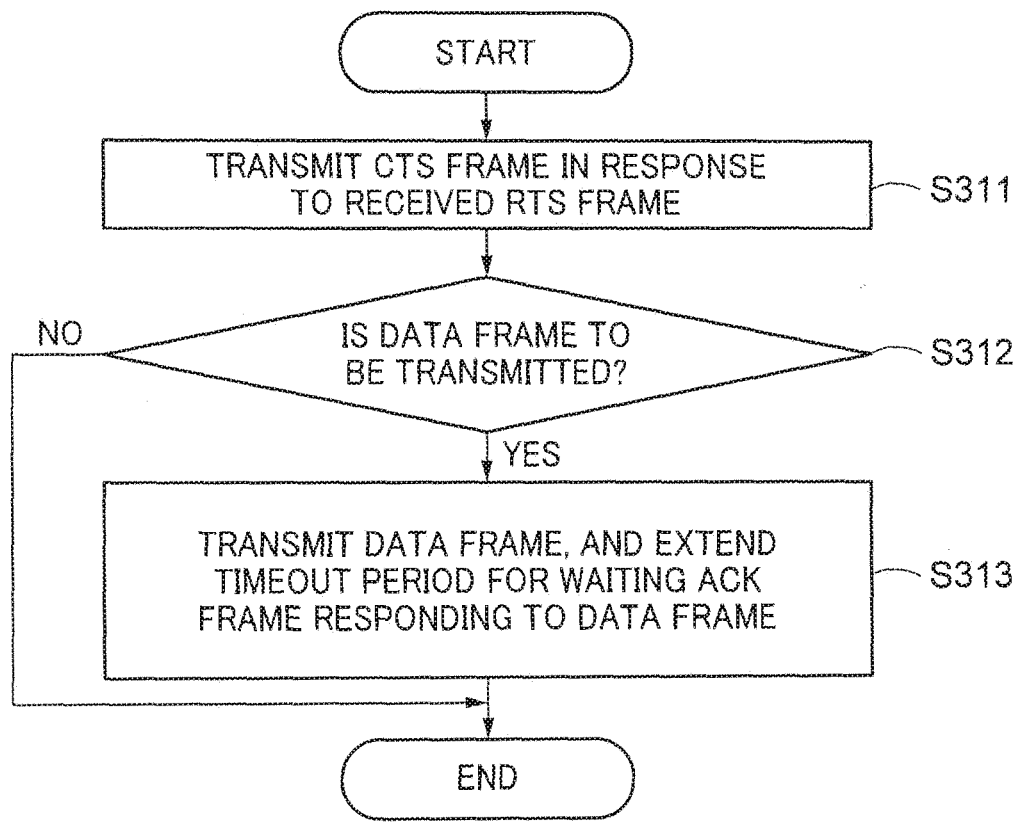
FIG. 14 is a diagram showing a flowchart example of operations of the access point according to the embodiment.

FIG. 14 shows a flowchart example of the operation of the access point 11 according to the present embodiment. This operation of the access point 11 corresponds to the operation of the access point 11 in the sequence example in FIG. 8. The access point 11 transmits the CTS frame 582 in response to the received RTS frame 581 (S311), and receives the data frame 583 after elapse of an SIFS time since completion of transmission of the CTS frame 582 (S312). When the access point 11 transmits the data frame 584 to the relay station 21 simultaneously with reception of the data frame 583, that is, when the access point 11 transmits the data frame 584 to a terminal (here, the relay station) that is same as the reception destination of the CTS frame 582 after elapse of an SIFS time since completion of transmission of the CTS frame 582 (YES at S312), the access point 11 extends a timeout period for an ACK frame during which the access point 11 waits after transmitting the data frame 584 (S313). For example, although a normal timeout period is a total time of an SIFS time and an ACK frame length, the wait time is extended to two times of this total time. The access point 11 transmits the ACK frame 585 after elapse of an SIFS time since completion of reception of the data frame 583. Further, the access point 11 waits to receive the ACK frame 586 from the relay station 21 in the extended wait time after completion of transmission of the data frame 584.

Figure 15:
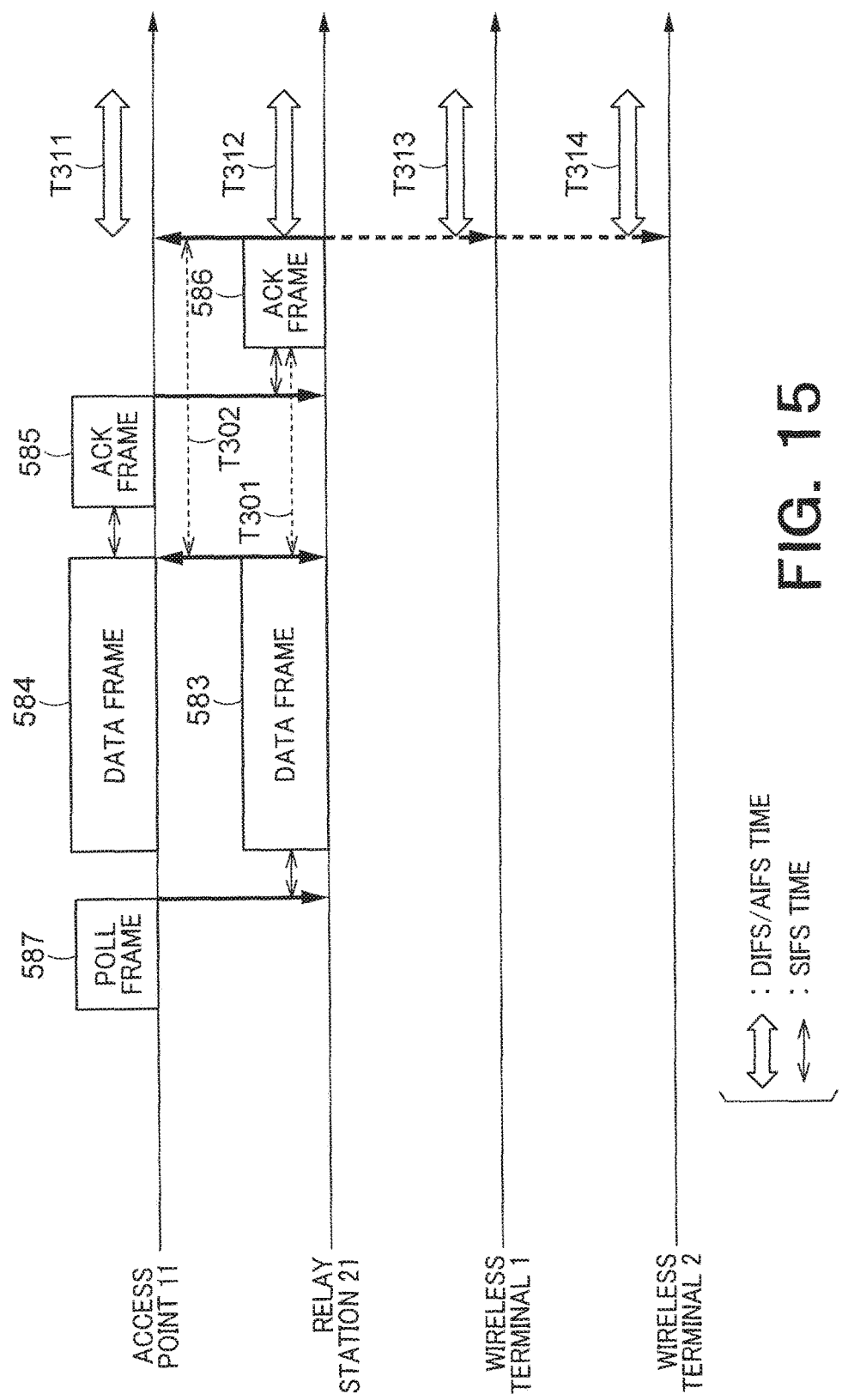
FIG. 15 is a diagram illustrating a modification of the sequence in FIG. 8.

In the sequence examples in FIGS. 6 to 8, the sequence is started by transmission and reception of the RTS frame and the CTS frame. However, this is an example and other embodiment is possible. For example, a modification of the sequence in FIG. 8 is illustrated in FIG. 15. The access point 11 transmits to the relay station 21 a poll frame 587 which is an example of a frame for permitting transmission. The relay station 21 transmits the data frame 583 to the access point 11 after elapse of an SIFS time since the transmission. At that time, the access point 11 may transmit the data frame 583 and the data frame 584 to the relay station 21 at the same time. That is, the access point 11 may transmit the data frame 584 after elapse of an SIFS time since completion of transmission of the poll frame. The IEEE 802.11 standard defines a plurality of types of a poll frame. However, any type of a poll frame may be used as long as the poll frame has a function for prompting transmission of frames. When a poll frame is transmitted, not a DIFS time but a PIFS (point coordination function interframe space) may be used as a fixed time prior to backoff, in CCA processing under CSMA/CA. The same as in the description of FIG. 8 applies for the following actions in the sequence in FIG. 15. Various modifications and extensions, which have been described above, can be applied to the sequence in FIG. 15.

Figure 16:
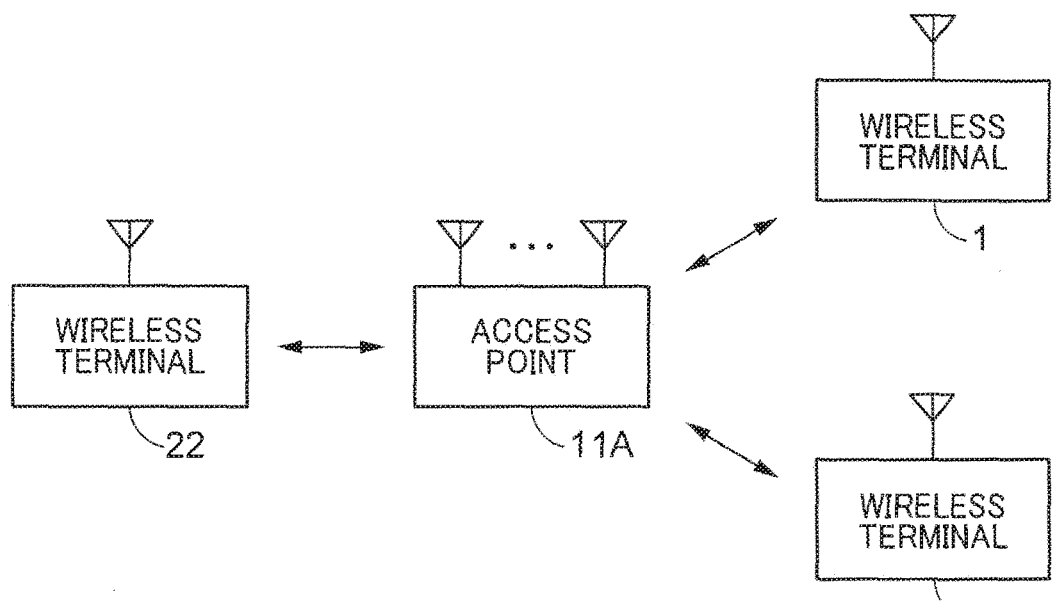
FIG. 16 is a diagram illustrating another example of the wireless communication system according to the embodiment.

The present embodiment is based on the configuration of a wireless LAN illustrated in FIG. 1. However, the configuration of a wireless LAN is not limited to FIG. 1. For example, as illustrated in FIG. 16, a wireless LAN may include an access point 11A, a terminal 22, the terminal 1, and the terminal 2. In this case, for example, the access point 11A relays communication between the terminal 1 and the terminal 22, and further relays communication between the terminal 2 and the terminal 22. Similarly to the relay station 21 in FIG. 1, the access point 11A performs full-duplex communication. A sequence similar to those in FIGS. 6 to 8 and 15 can be performed in the configuration in FIG. 16. In this case, the terminal 22 may perform communication, similarly to the access point 11 in FIG. 1.

Figure 17:
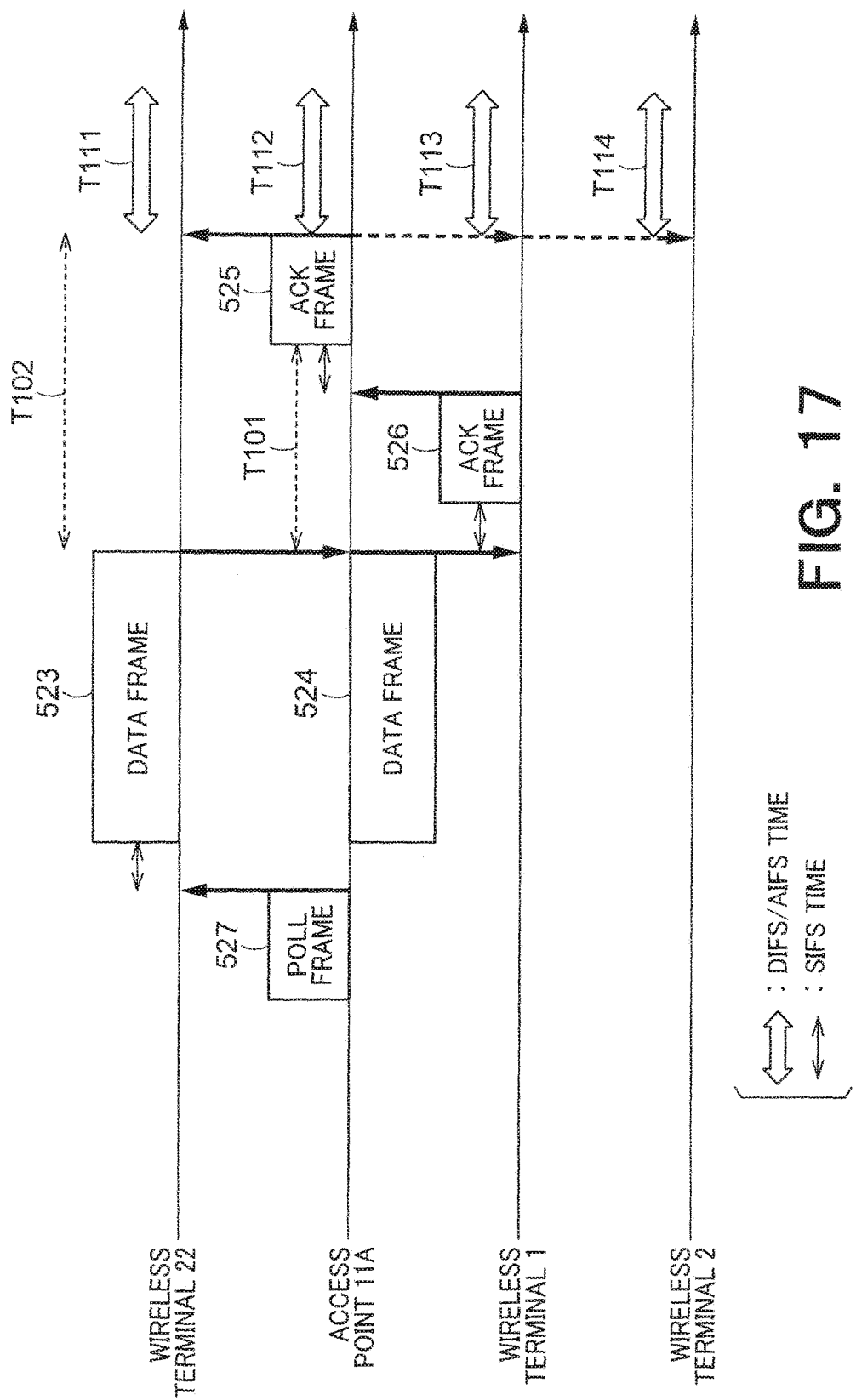
FIG. 17 is a diagram illustrating a fourth communication sequence example according to the embodiment.

Another sequence example for the configuration in FIG. 16 is illustrated in FIG. 17. The access point 11A transmits the poll frame 527 to the terminal 22, and after elapse of an SIFS time since the transmission, the terminal 22 transmits the data frame 523 to the access point 11A. At that time, the access point 11A may receive the data frame 523 and transmit the data frame 524 to the terminal 1 at the same time. That is, the access point 11A may transmit the data frame 524 to the terminal 1 after elapse of an SIFS time since completion of transmission of the poll frame 527. The same as in the description of FIG. 6 applies for the following actions in the sequence in FIG. 17. The various modifications and extensions, which have been described above, can be applied to the sequence in FIG. 17.

Other than the configurations illustrated in FIG. 1 and FIG. 16, various configurations of a wireless LAN can be applied. Other than the sequences which have been described above, various sequences can be applied depending on the various configurations.

Figure 18:
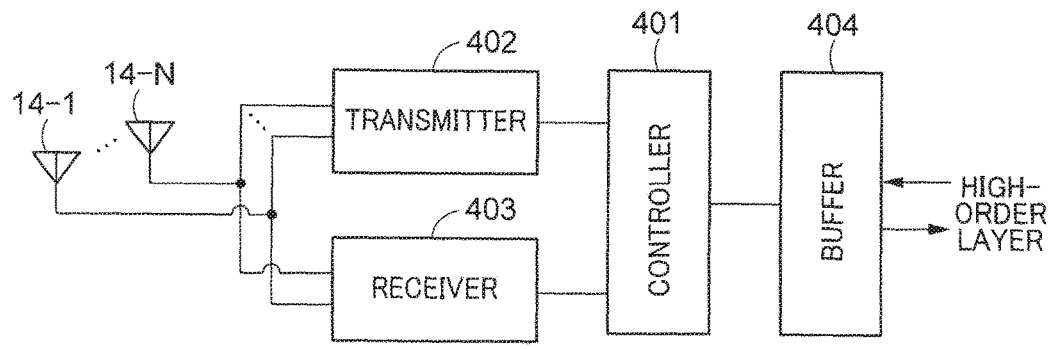
FIG. 18 is a function block diagram of a wireless communication device to be mounted to a relay station.

FIG. 18 is a function block diagram of a wireless communication device to be mounted on the relay station 21. In the wireless communication device, setting relating to frame relay is performed in advance with the access point 11.

The wireless communication device in FIG. 18 includes a controller 401, a transmitter 402, a receiver 403, one or more antennas 14-1 to 14-N(N represents an integer of 1 or more), and a buffer 404. A switch for switching each antenna between the transmitter 402 and the receiver 403 may be provided. The controller 401 controls communication with terminals (including an access point), and corresponds to controlling circuitry. The controlling circuitry may be a baseband integrated circuit, an integrated circuit for wireless communication, or a communication control device. As an example, the transmitter 402 and the receiver 403 configure a wireless communicator. Processing in the controller 401, the baseband integrated circuit, the integrated circuit for wireless communication or the communication control device may be performed using software (a program) which is operated by a processor such as a CPU, may be performed using hardware, or may be performed using both software and hardware.

The buffer 404 is used as a storage area for exchange of data between a high-order layer and the controller 401. Further, the buffer 404 may temporarily store therein data contained in a frame which is received from a terminal (including an access point) in order to relay the data to another terminal. When receiving a frame addressed to this wireless communication device, the buffer 404 may temporarily store therein data contained in the frame in order to transfer the data to the high-order layer. The high-order layer performs processing relating to a communication protocol such as a TCP/IP or a UDP/IP which is upper than an MAC layer managed by the controller 401. Further, the high-order layer may perform processing of an application layer in addition to processing relating to a TCP/IP or a UDP/IP. The operations in the high-order layer may be performed through processing using software (a program) which is operated by a processor such as a CPU, may be performed using hardware, or may be performed using both software and hardware.

The controller 401 mainly performs processing of a MAC layer and a part of processing of a physical layer. The controller 401 transmits and receives frames through the transmitter 402 and the receiver 403 to control communication with terminals (including an access point). The controller 401 may include a clock generator that generates a clock, or may be configured to receive a clock from the outside. The controller 401 may use a clock generated by the clock generator or a clock input from the outside to manage the internal time. The controller 401 may output a clock generated by the clock generator to the outside. Further, the controller 401 manages an MAC layer and a PHY layer, and stores information required for the management in a buffer inside the controller 401 or in a buffer outside the controller 401. The buffer may further manage information relating to terminals under a relay station and information relating the access point. This buffer may be a storage medium same as the buffer 404 or a separate medium. This buffer and the buffer 404 may be memories, or devices such as SSDs or hard disks. When this buffer and the buffer 404 are memories, the memories may be a volatile memory such as DRAM, or may be a non-volatile memory such as NAND, MRAM.

When the controller 401 holds data or information to be transmitted, the controller 401 generates a frame including the data or information, acquires a transmission right in accordance with a communication scheme used here, and transmits the frame through the transmitter 402. As an example, when the controller 401 performs carrier sense under CSMA/CA, determines that a wireless medium is idle, and succeeds in acquiring a transmission right, the controller 401 outputs a frame to the transmitter 402 in TXOP based on the transmission right.

The controller 401 may check whether data to be transmitted exits by checking the buffer 404 periodically or by a trigger from the outside of the buffer 404 etc.

The transmitter 402 performs desired processing of a physical layer such as modulation processing or addition of a physical header, on a frame input from the controller 401. Further, the transmitter 402 performs, on the frame after the processing of a physical layer, DA conversion, filtering processing for extracting a desired band component, frequency conversion (up-conversion), etc. The transmitter 402 amplifies a signal after frequency conversion, and radiates the signal as a radio wave from the antenna to a space.

A signal received by the antenna is input to the receiver 403, and analog processing and AD conversion processing are performed on the signal. For example, the received signal is amplified, and frequency conversion (down-conversion) is performed on the signal, and a desired band component is extracted by filtering processing. The extracted signal is further converted to a digital signal by AD conversion. After processing of a physical layer, such as demodulation is performed on the basis of the digital signal, a frame is output to the controller 401.

When transmission and reception are performed at the same time, that is, when full-duplex communication is performed, one of the plurality of antennas may be connected to the receiver and the other may connected to the transmitter such that the antennas are divided to the transmitter and the receiver. When there is no switch for switching the antennas between the receiver and the transmitter, a transmission signal sneaks around a signal received by an antenna, and thus, the signals which are present together may be input to the receiver 403. Therefore, the reception signal may be taken out by removing the transmission signal from the mixed signals at the receiver 403 or a circuit placed at a preceding stage of the receiver 403 (for example, by providing a path for inputting a transmission signal output from the transmitter 402 to the receiver 403 or a circuit at the preceding stage, and subtracting the transmission signal from the mixed signals). The reception signal may be taken out from the mixed signals by a method other than the methods described above.

When the controller 401 receives a frame such as a data frame which requires a response, the controller 401 performs control such that a delivery acknowledgement response frame is transmitted after elapse of a fixed time such as an SIFS time since completion of reception of the frame. For example, the controller 401 performs CRC check, etc. on the basis of the FCS field of the received frame. When the check result is success, an ACK frame is generated and the ACK frame is transmitted through the transmitter 402 after elapse of an SIFS time since completion of the reception. When the received frame is A-MPDU, CRC check, etc. is performed for each frame connected in A-MPDU so that a BA frame including values according to the check results is generated instead of an ACK frame. When the controller 401 receives an RTS frame, the controller 401 returns a CTS frame as the delivery acknowledgement response frame. At that time, when a predetermined condition is satisfied, a wait time before transmission of the ACK frame (the BA frame for A-MPDU) since completion of reception of the frame is extended. As an example, the wait time is extended to a total time of two times of an SIFS time and an ACK frame length. Examples of the predetermined condition include a case where a CTS frame is returned in response to an RTS frame received by an access point and a frame is transmitted to a separate terminal after elapse of an SIFS time after the returning. In this case, an ACK frame is transmitted after elapse of the extended wait time since completion of reception of a frame which is received from an access point, according to the CTS frame (see the sequence example in FIG. 6). Another example is a case where a CTS frame is received in response to an RTS frame having been transmitted to an access point and a data frame is received from the access point after elapse of an SIFS time since completion of reception of the CTS frame. In this case, an ACK frame is transmitted after elapse of the extended wait time since completion of reception of the data frame (see the sequence example in FIG. 8). As is clear from the above sequence examples, examples other than the examples described here may be applied.

When the controller 401 transmits a frame which requires a response, the controller 401 waits to receive a response frame after completion of the transmission. For example, when the controller 401 transmits a data frame, the controller 401 waits to receive an ACK frame after elapse of an SIFS time. When the controller 401 does not receive an ACK frame during a wait time which is a total of an SIFS time and an ACK frame lengths since completion of transmission of the data frame, the controller 401 determines that a timeout period for an ACK frame has elapsed and determines to re-transmit the data frame. However, when a predetermined condition is satisfied, a timeout period for an ACK frame is extended. For example, the timeout period is extended to two times a time obtained by adding an SIFS time and an ACK frame length. Examples of the predetermined condition include a case where a CTS frame is transmitted in response to an RTS frame received from a terminal and a data frame is transmitted to the access point after elapse of an SIFS time since completion of transmission of the CTS frame (see the sequence in FIG. 7). At that time, the Duration value in the CTS frame is set to be smaller than the aforementioned expected value. Counting the extended timeout period is started at a time of completion of transmission of the data frame, and reception of an ACK frame is awaited.

The above assignment of processing to the controller 401 and the transmitter 402 is an example. Other embodiments may be applied. For example, the controller 401 may perform processing up to processing of a digital domain, and the transmitter 402 may perform processing of DA conversion and later. Similarly, regarding to assignment of processing to the controller 401 and the receiver 403, the receiver 403 may perform processing up to AD conversion, and the controller 401 may perform following processing of a digital domain including processing of a physical layer. Assignment other than the aforementioned assignments may be performed.

Figure 19:
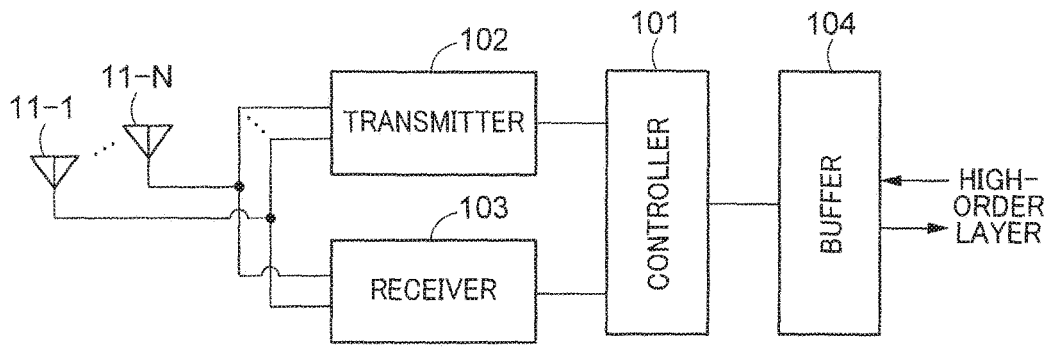
FIG. 19 is a function block diagram of a wireless communication device to be mounted to an access point.

FIG. 19 is a function block diagram of a wireless communication device to be mounted on an access point.

The wireless communication device in FIG. 19 includes a controller 101, a transmitter 102, a receiver 103, one or more antennas 11-1 to 11-N(N represents an integer of 1 or more), and a buffer 104. The controller 101 controls communication with a terminal (including the relay station 21), and corresponds to controlling circuitry. The controlling circuitry may be a baseband integrated circuit, an integrated circuit for wireless communication, or a communication control device. As an example, the transmitter 102 and the receiver 103 configure a wireless communicator. Processing in the controller 101, the baseband integrated circuit, the integrated circuit for wireless communication, or the communication control device may be performed using software (a program) which is operated by a processor such as a CPU, may be performed using hardware, or may be performed using both software and hardware.

The buffer 104 is used as a storage area for exchange of data between a high-order layer and the controller 101. Further, the buffer 104 may store therein a frame which is received from an external network in order to relay the frame to a relay station. The buffer 104 may store therein a frame which is received from the relay station in order to transfer the frame to an external network. A high-order layer performs processing relating to a protocol such as a TCP/IP or a UDP/IP which is upper than an MAC layer managed by the controller 101. Further, the high-order layer may perform processing of an application layer in addition to processing relating to a TCP/IP or a UDP/IP. The operations in the high-order layer may be performed through processing using software (a program) which is operated by a processor such as a CPU, may be performed using hardware, or may be performed using both software and hardware.

The controller 101 mainly performs processing of a MAC layer and a part of processing of a physical layer. The controller 101 transmits and receives frames through the transmitter 102 and the receiver 103 to control communication with a terminal (including a relay station). The controller 101 performs also control such that a beacon frame is transmitted periodically. The controller 101 may include a clock generator for generating a clock or may be configured to receive a clock from the outside. The controller 101 may use a clock generated by the clock generator or a clock input from the outside to manage an internal time. Further, the controller 101 may output a clock generated by the clock generator to the outside. The controller 101 manages an MAC layer and a PHY layer, and stores information required for the management in a buffer inside the controller 101 or in a buffer outside the controller 101. The controller 101 also manages information relating to the statuses, the performances, etc. of terminals (including the relay station) which belong to the BSS. This buffer may be a storage medium same as the buffer 104 or a separate storage medium. This buffer and the buffer 104 may be memories, or devices such as SSDs or hard disks. When this buffer and the buffer 404 are memories, the memories may be a volatile memory such as DRAM, or may be a non-volatile memory such as NAND, MRAM. When the relay station 21 has a function as an access point, the relay station 21 is assumed to have a function same as that of the access point 11, such as a function for forming a BSS or a function for transmitting a beacon frame.

When the controller 101 holds data or information to be transmitted, the controller 101 generates a frame including the data or information, acquires a transmission right in accordance with a communication system used here, and transmits the frame through the transmitter 102. As an example, when the controller 101 performs carrier sense under CSMA/CA, determines that a wireless medium is idle, and succeeds in acquiring a transmission right, the controller 101 outputs a frame to the transmitter 102 in TXOP based on the transmission right.

The controller 101 may check whether data to be transmitted exits by checking the buffer 104 periodically or by a trigger from the outside of the buffer 104 etc.

The transmitter 102 performs desired processing of a physical layer such as modulation processing or addition of a physical header, on a frame input from the controller 101. Further, the transmitter 102 performs, on the frame after the processing of a physical layer, DA conversion, filtering processing for extracting a desired band component, frequency conversion (up-conversion), etc. The transmitter 102 amplifies a signal after frequency conversion, and radiates the signal as a radio wave from the antenna to a space.

A signal received by the antenna is input to the receiver 103, and analog processing and AD conversion processing are performed on the signal. For example, the received signal is amplified, frequency conversion (down-conversion) is performed on the signal, and a desired band component is extracted by filtering processing. The extracted signal is further converted to a digital signal by AD conversion. After processing of a physical layer, such as demodulation is performed on the basis of the digital signal, a frame is output to the controller 101.

When the controller 101 receives a frame such as a data frame which requires a response, the controller 101 performs control such that a delivery acknowledgement response frame is transmitted after elapse of a fixed time such as an SIFS time since completion of reception of the frame. For example, the controller 101 performs CRC check, etc. on the basis of the FCS field of the received frame. When the check result is success, an ACK frame is generated and the ACK frame is transmitted through the transmitter 102 after elapse of an SIFS time since completion of the reception. When the received frame is A-MPDU, CRC check, etc. is performed for each frame connected in A-MDPU so that a BA frame including values according to the check results is generated, instead of an ACK frame. When the controller 101 receives an RTS frame, the controller 101 returns a CTS frame as the delivery acknowledgement response frame. At that time, when a predetermined condition is satisfied, a wait time before transmission of the ACK frame (the BA frame for A-MPDU) is extended. As an example, the wait time is extended to a total time of two times of an SIFS time and an ACK frame length. As an example of the predetermined condition, when a CTS frame addressed to a separate terminal is received and a data frame addressed to the wireless communication device is received after elapse of an SIFS time after the reception, an ACK frame is transmitted after elapse of the extended wait time (see the sequence example in FIG. 7).

When the controller 101 transmits a frame which requires a response, the controller 101 waits to receive a response frame after completion of the transmission. For example, when the controller 101 transmits a data frame, the controller 101 waits to receive an ACK frame after elapse of an SIFS time. When the controller 101 does not receive an ACK frame during a wait time which is a total of an SIFS time and an ACK frame length, the controller 101 determines that a timeout period for an ACK frame has elapsed and determines to re-transmit the data frame. At that time, when a predetermined condition is satisfied, a timeout period for an ACK frame is extended. As an example, the timeout period is extended to two times a time obtained by adding an SIFS time and an ACK frame length. Examples of the predetermined condition include a case where a CTS frame is received in response to the transmitted RTS frame and the Duration value of the CTS frame is smaller than an expected value (see the sequence in FIG. 6). In this case, counting the extended timeout period is started at a time of completion of transmission of the data frame which is transmitted after elapse of an SIFS time since completion of reception of the CTS frame, and reception of an ACK frame is awaited.

The above assignment of processing to the controller 101 and the transmitter 102 is an example. Other embodiments may be applied. For example, the controller 101 may perform processing up to processing of a digital domain, and the transmitter 102 may perform processing of DA conversion and later. Similarly, regarding to assignment of processing to the controller 101 and the receiver 103, the receiver 103 may perform processing up to AD conversion, and the controller 101 may perform following processing of a digital domain including processing of a physical layer. Assignment other than the aforementioned assignments may be performed.

A configuration of the access point 11 when performing full-duplex communication may be same as that of the relay station 21.

Figure 20:
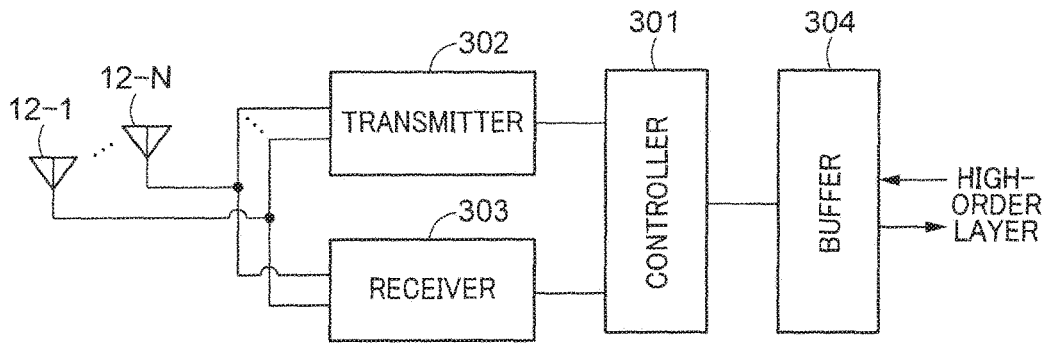
FIG. 20 is a function block diagram of a wireless communication device to be mounted to a terminal.

FIG. 20 is a function block diagram of a wireless communication device to be mounted on a terminal (which is not an access point or a relay station).

The wireless communication device in FIG. 20 includes a controller 201, a transmitter 202, a receiver 203, one or more antennas 12-1 to 12-N(N represents an integer of 1 or more), and a buffer 204. The controller 201 controls communication with separate terminals (including the relay station 21 and the access point 11), and corresponds to controlling circuitry. The controlling circuitry may be a baseband integrated circuit, an integrated circuit for wireless communication, or a communication control device. As an example, the transmitter 202 and the receiver 203 configure a wireless communicator. Processing in the controller 201, the baseband integrated circuit, the integrated circuit for wireless communication, or the communication control device may be performed using software (a program) which is operated by a processor such as a CPU, may be performed using hardware, or may be performed using both software and hardware.

The buffer 204 is used as a storage area for exchange of data between a high-order layer and the controller 201. The high-order layer performs processing regarding to a communication protocol such as a TCP/IP or a UDP/IP which is upper than an MAC layer managed by the controller 201. Further, the high-order layer may perform processing of an application layer in addition to processing relating to a TCP/IP or a UDP/IP. The operations in the high-order layer may be performed through processing using software (a program) which is operated by a processor such as a CPU, may be performed using hardware, or may be performed using both software and hardware.

The controller 201 mainly performs processing of a MAC layer and a part of processing of a physical layer. The controller 201 transmits and receives frames through the transmitter 202 and the receiver 203 to control communication with separate terminals (including a relay station and an access point). The controller 201 may include a clock generator for generating a clock or is configured to receive a clock from the outside. The controller 201 may use a clock generated by the clock generator or a clock input from the outside to manage an internal time. The controller 201 may output the clock generated by the clock generator to the outside. Further, the controller 201 manages an MAC layer and a PHY layer, and stores information required for the management in a buffer inside the controller 201 or in a buffer outside the controller 201. This buffer may be a storage medium same as to the buffer 204 or a separate medium. This buffer and the buffer 204 may be memories, or devices such as SSDs or hard disks. When this buffer and the buffer 204 are memories, the memories may be volatile memories such as DRAM, or may be non-volatile memories such as NAND, MRAM.

The controller 201 sends an association request to the access point 11, and establishes a wireless link with the access point 11 after a process of authentication, etc., if needed. Establishment of a wireless link causes the wireless communication device to belong to a BSS formed by the access point 11. The controller 201 manages information on the status, the performance, etc. of the access point 11 with which the wireless link has been established. The controller 201 may further manage information on the status, the performance, etc. of the relay station 21. In order to act as a relay station to terminals, the relay station 21 may perform setting relating to relay with the access point 11 and acquire information relating the attribution etc. of the access point 11 in the BSS. When the relay station 21 has a function as an access point, the controller 201 is assumed to perform an operation for an access point, e.g., an association process, on the relay station 21.

When the controller 201 holds data or information to be transmitted, the controller 201 generates a frame including the data or information, acquires a transmission right according to a communication scheme used, and transmits the frame through the transmitter 202. As an example, when the controller 201 performs carrier sense under CSMA/CA, determines that a wireless medium is idle, and succeeds in acquiring a transmission right, the controller 201 outputs a frame to the transmitter 202 in TXOP based on the transmission right.

The controller 201 may check whether data to be transmitted exits by checking the buffer 204 periodically or by a trigger from the outside of the buffer 204 etc.

The transmitter 202 performs desired processing of a physical layer, such as modulation processing or addition of a physical header, on a frame input from the controller 201. Further, the transmitter 202 performs, on the frame after the processing of a physical layer, DA conversion, filtering processing for extracting a desired band component, frequency conversion (up-conversion), etc. The transmitter 202 amplifies a signal after frequency conversion, and radiates the signal as a radio wave from the antenna to a space.

A signal received by an antenna is input to the receiver 203, and analog processing and AD conversion processing are performed on the signal. For example, the received signal is amplified, frequency conversion (down-conversion) is performed on the signal, and a desired band component is extracted by filtering processing. The extracted signal is converted to a digital signal by further AD conversion. After processing of a physical layer, such as demodulation is performed on the basis of the digital signal, a frame is output to the controller 201.

When the controller 201 receives a frame such as a data frame which requires a response, the controller 201 performs control such that a delivery acknowledgement response frame is transmitted after elapse of a fixed time such as an SIFS time since completion of reception of the frame. For example, the controller 201 performs CRC check, etc. on the basis of the FCS field of the received frame. When the check result is success, an ACK frame is generated and the ACK frame is transmitted through the transmitter 202 after elapse of an SIFS time since completion of the reception. When the received frame is A-MPDU, CRC check, etc. is performed for each frame connected in A-MDPU so that a BA frame including values according to the check results is generated instead of an ACK frame. When the controller 201 receives an RTS frame, the controller 201 returns a CTS frame as the delivery acknowledgement response frame.

When the controller 201 transmits a frame which requires a response, the controller 201 waits to receive a response frame after completion of the transmission. For example, when a data frame is transmitted, the controller 201 starts to wait to receive an ACK frame after elapse of an SIFS time. When the controller 201 does not receive an ACK frame during a wait time which is a total of an SIFS time and an ACK frame length, the controller 201 determines that a timeout period for an ACK frame has elapsed and determined to re-transmit the data frame.

The above assignment of processing to the controller 201 and the transmitter 202 is an example. Other embodiments may be applied. For example, the controller 201 may perform processing up to processing of a digital domain, and the transmitter 202 may perform processing of DA conversion and later. Similarly, regarding to assignment of processing to the controller 201 and the receiver 203, the receiver 203 may perform processing up to AD conversion, and the controller 201 may perform following processing of a digital domain including processing of a physical layer. Assignment other than the aforementioned assignments may be performed.

A terminal may have a configuration supporting a full-duplex method, similarly to the relay station 21, the access point 11, or both thereof. Further, the terminal may have a function for extending a timeout period for an ACK frame, a function for extending a wait time for an ACK frame, and the like, similar to the relay station 21 and the access point 11. When the terminal supports a full-duplex method, the terminal may have a configuration in the same manner as the relay station 21.

The frames described in the present invention refer not only to "frames" in a sense of the IEEE 802.11 standard but also to "packets" including a Null data packet in some cases.

Second Embodiment

Figure 21:
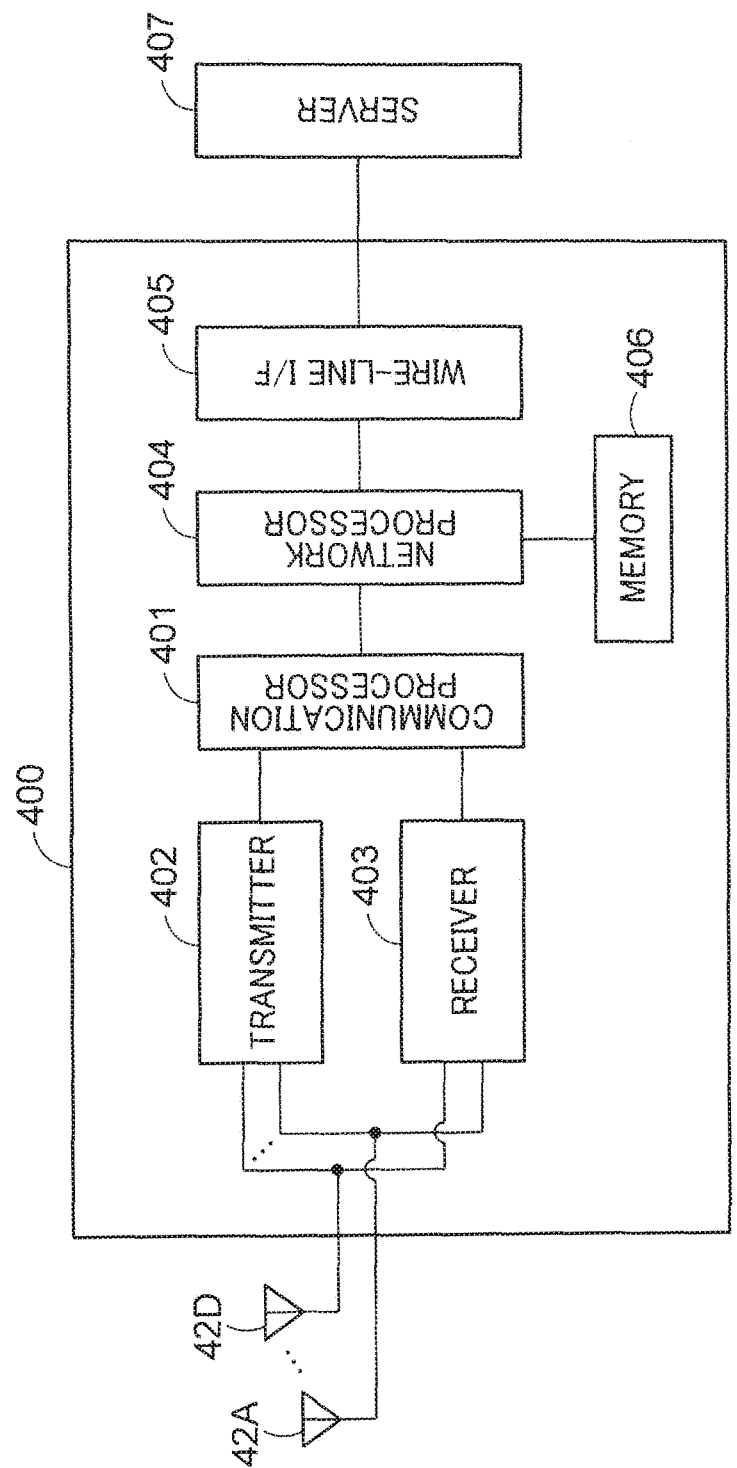
FIG. 21 is a function block diagram of an access point, a relay station, or a terminal.

FIG. 21 is a functional block diagram of a base station (access point) 400 according to a second embodiment. The access point includes a communication processor 401, a transmitter 402, a receiver 403, antennas 42A, 42B, 42C, and 42D, a network processor 404, a wired I/F 405, and a memory 406. The access point 400 is connected to a server 407 through the wired I/F 405. The communication processor 401 has functions similar to the controller 101 described in the first embodiment. The transmitter 402 and the receiver 403 have functions similar to the transmitter 102 and the receiver 103 described in the first embodiment. The network processor 404 has functions similar to the higher processor described in the first embodiment. The communication processor 401 may internally possess a buffer for transferring data to and from the network processor 404. The buffer may be a volatile memory, such as an SRAM or a DRAM, or may be a non-volatile memory, such as a NAND or an MRAM.

The network processor 404 controls data exchange with the communication processor 401, data writing and reading to and from the memory 406, and communication with the server 407 through the wired I/F 405. The network processor 404 may execute a higher communication process of the MAC layer, such as TCP/IP or UDP/IP, or a process of the application layer. The operation of the network processor may be performed through processing of software (program) by a processor, such as a CPU. The operation may be performed by hardware or may be performed by both of the software and the hardware.

For example, the communication processor 401 corresponds to a baseband integrated circuit, and the transmitter 402 and the receiver 403 correspond to an RF integrated circuit that transmits and receives frames. The communication processor 401 and the network processor 404 may be formed by one integrated circuit (one chip). Parts that execute processing of digital areas of the transmitter 402 and the receiver 403 and parts that execute processing of analog areas may be formed by different chips. The communication processor 401 may execute a higher communication process of the MAC layer, such as TCP/IP or UDP/IP. Although the number of antennas is four here, it is only necessary that at least one antenna is included.

The memory 406 saves data received from the server 407 and data received by the receiver 402. The memory 406 may be, for example, a volatile memory, such as a DRAM, or may be a non-volatile memory, such as a NAND or an MRAM. The memory 406 may be an SSD, an HDD, an SD card, an eMMC, or the like. The memory 406 may be provided outside of the base station 400.

The wired I/F 405 transmits and receives data to and from the server 407. Although the communication with the server 407 is performed through a wire in the present embodiment, the communication with the server 407 may be performed wirelessly. In this case, a wireless I/F may be employed instead of the wired I/F 405.

The server 407 is a communication apparatus that returns a response including requested data in response to reception of a data forward request for requesting transmission of the data. Examples of the server 407 include an HTTP server (Web server) and an FTP server. However, the server 407 is not limited to these as long as the server 407 has a function of returning the requested data. The server 407 may be a communication apparatus operated by the user, such as a PC or a smartphone.

When the STA belonging to the BSS of the base station 400 issues a forward request of data for the server 407, a packet regarding the data forward request is transmitted to the base station 400. The base station 400 receives the packet through the antennas 42A to 42D. The base station 400 causes the receiver 403 to execute the process of the physical layer and the like and causes the communication processor 401 to execute the process of the MAC layer and the like.

The network processor 404 analyzes the packet received from the communication processor 401. Specifically, the network processor 404 checks the destination IP address, the destination port number, and the like. When the data of the packet is a data forward request such as an HTTP GET request, the network processor 404 checks whether the data requested by the data forward request (for example, data in the URL requested by the HTTP GET request) is cached (stored) in the memory 406. A table associating the URL (or reduced expression of the URL, such as a hash value or an identifier substituting the URL) and the data is stored in the memory 406. The fact that the data is cached in the memory 406 will be expressed that the cache data exists in the memory 406.

When the cache data does not exist in the memory 406, the network processor 404 transmits the data forward request to the server 407 through the wired I/F 405. In other words, the network processor 404 substitutes the STA to transmit the data forward request to the server 407. Specifically, the network processor 404 generates an HTTP request and executes protocol processing, such as adding the TCP/IP header, to transfer the packet to the wired I/F 405. The wired I/F 405 transmits the received packet to the server 407.

The wired I/F 405 receives, from the server 407, a packet that is a response to the data forward request. From the IP header of the packet received through the wired I/F 405, the network processor 404 figures out that the packet is addressed to the STA and transfers the packet to the communication processor 401. The communication processor 401 executes processing of the MAC layer and the like for the packet. The transmitter 402 executes processing of the physical layer and the like and transmits the packet addressed to the STA from the antennas 42A to 42D. The network processor 404 associates the data received from the server 407 with the URL (or reduced expression of the URL) and saves the cache data in the memory 406.

When the cache data exists in the memory 406, the network processor 404 reads the data requested by the data forward request from the memory 406 and transmits the data to the communication processor 401. Specifically, the network processor 404 adds the HTTP header or the like to the data read from the memory 406 and executes protocol processing, such as adding the TCP/IP header, to transmit the packet to the communication processor 401. In this case, the transmitter IP address of the packet is set to the same IP address as the server, and the transmitter port number is also set to the same port number as the server (destination port number of the packet transmitted by the communication terminal), for example. Therefore, it can be viewed from the STA as if communication with the server 407 is established. The communication processor 401 executes processing of the MAC layer and the like for the packet. The transmitter 402 executes processing of the physical layer and the like and transmits the packet addressed to the STA from the antennas 42A to 42D.

According to the operation, frequently accessed data is responded based on the cache data saved in the memory 406, and the traffic between the server 407 and the base station 400 can be reduced. Note that the operation of the network processor 404 is not limited to the operation of the present embodiment. There is no problem in performing other operation when a general caching proxy is used, in which data is acquired from the server 407 in place of the STA, the data is cached in the memory 406, and a response is made from the cache data of the memory 406 for a data forward request of the same data.

The base station (access point) of the present embodiment can be applied as the base station of the first embodiment. In the present embodiment, although the base station with the cache function is described, a terminal (STA) with the cache function or a relay with the cache function can also be realized by the same block configuration as FIG. 21. In this case, the wired I/F 405 may be omitted.

Third Embodiment

Figure 22:
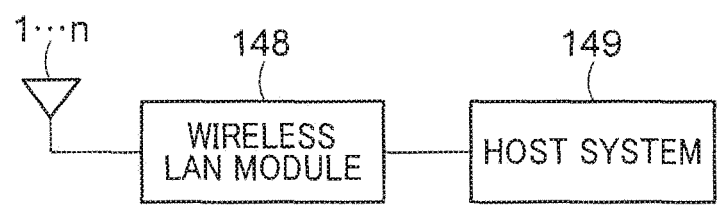
FIG. 22 is a diagram illustrating an entire configuration example of a terminal, an access point, or a relay station.

FIG. 22 shows an example of entire configuration of a terminal or a base station. The example of configuration is just an example, and the present embodiment is not limited to this. The terminal or the base station includes one or a plurality of antennas 1 to n (n is an integer equal to or greater than 1), a wireless LAN module 148, and a host system 149. The wireless LAN module 148 corresponds to the wireless communication apparatus according to the first embodiment. The wireless LAN module 148 includes a host interface and is connected to the host system 149 through the host interface. Other than the connection to the host system 149 through the connection cable, the wireless LAN module 148 may be directly connected to the host system 149. The wireless LAN module 148 can be mounted on a substrate by soldering or the like and can be connected to the host system 149 through wiring of the substrate. The host system 149 uses the wireless LAN module 148 and the antennas 1 to n to communicate with external apparatuses according to an arbitrary communication protocol. The communication protocol may include the TCP/IP and a protocol of a layer upper than that. Alternatively, the TCP/IP may be mounted on the wireless LAN module 148, and the host system 149 may execute only a protocol in a layer upper than that. In this case, the configuration of the host system 149 can be simplified. Examples of the present terminal include a mobile terminal, a TV, a digital camera, a wearable device, a tablet, a smartphone, a game device, a network storage device, a monitor, a digital audio player, a Web camera, a video camera, a projector, a navigation system, an external adaptor, an internal adaptor, a set top box, a gateway, a printer server, a mobile access point, a router, an enterprise/service provider access point, a portable device, and a hand-held device.

Figure 23:
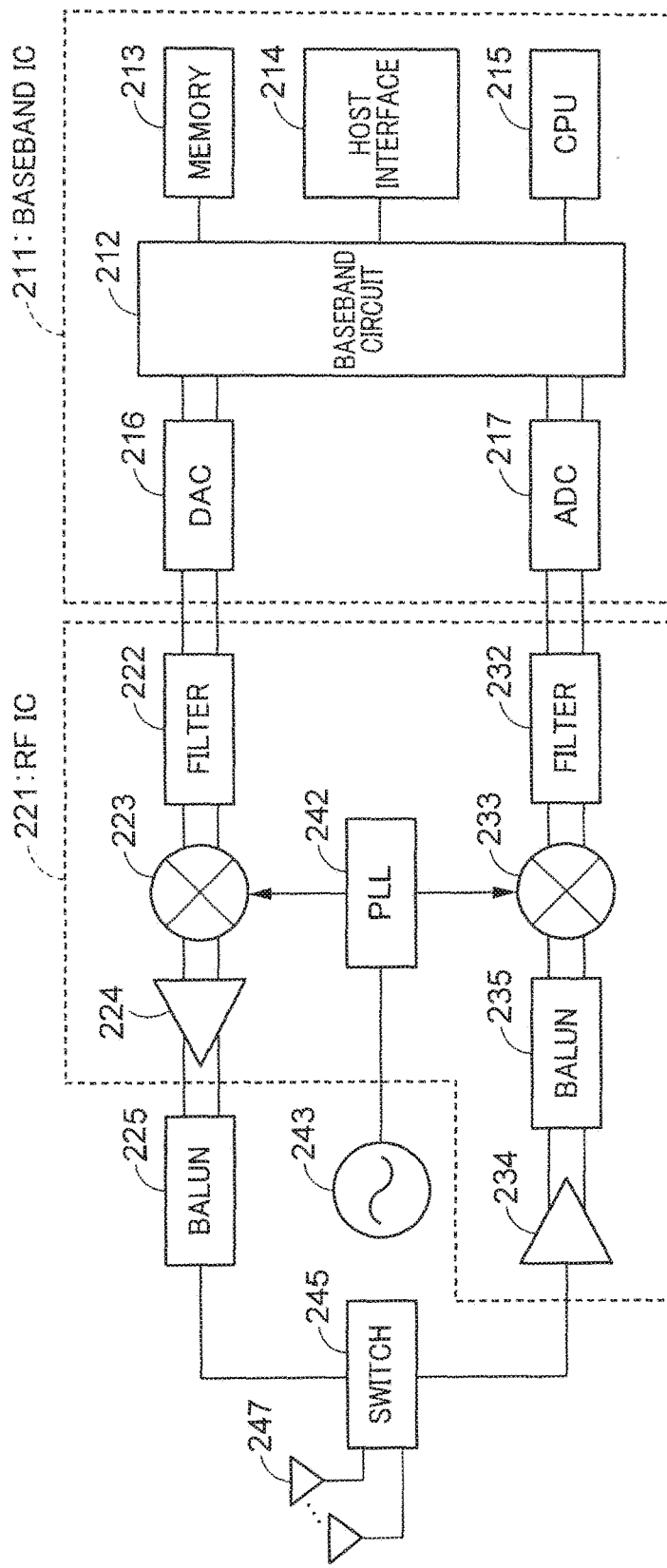
FIG. 23 is a diagram illustrating a hardware configuration example of a wireless LAN module to be mounted to a terminal, an access point, or a relay station.

FIG. 23 shows an example of hardware configuration of a wireless LAN module. The configuration can also be applied when the wireless communication apparatus is mounted on either one of the terminal that is a non-base station and the base station. Therefore, the configuration can be applied as an example of specific configuration of the wireless communication apparatus shown in FIG. 1. At least one antenna 247 is included in the example of configuration. When a plurality of antennas are included, a plurality of sets of a transmission system (216 and 222 to 225), a reception system (232 to 235), a PLL 242, a crystal oscillator (reference signal source) 243, and a switch 245 may be arranged according to the antennas, and each set may be connected to a control circuit 212. One or both of the PLL 242 and the crystal oscillator 243 correspond to an oscillator according to the present embodiment.

The wireless LAN module (wireless communication apparatus) includes a baseband IC (Integrated Circuit) 211, an RF (Radio Frequency) IC 221, a balun 225, the switch 245, and the antenna 247.

The baseband IC 211 includes the baseband circuit (control circuit) 212, a memory 213, a host interface 214, a CPU 215, a DAC (Digital to Analog Converter) 216, and an ADC (Analog to Digital Converter) 217.

The baseband IC 211 and the RF IC 221 may be formed on the same substrate. The baseband IC 211 and the RF IC 221 may be formed by one chip. Both or one of the DAC 216 and the ADC 217 may be arranged on the RF IC 221 or may be arranged on another IC. Both or one of the memory 213 and the CPU 215 may be arranged on an IC other than the baseband IC.

The memory 213 stores data to be transferred to and from the host system. The memory 213 also stores one or both of information to be transmitted to the terminal or the base station and information transmitted from the terminal or the base station. The memory 213 may also store a program necessary for the execution of the CPU 215 and may be used as a work area for the CPU 215 to execute the program. The memory 213 may be a volatile memory, such as an SRAM or a DRAM, or may be a non-volatile memory, such as a NAND or an MRAM.

The host interface 214 is an interface for connection to the host system. The interface can be anything, such as UART, SPI, SDIO, USB, or PCI Express.

The CPU 215 is a processor that executes a program to control the baseband circuit 212. The baseband circuit 212 mainly executes a process of the MAC layer and a process of the physical layer. One or both of the baseband circuit 212 and the CPU 215 correspond to the communication control apparatus that controls communication or the controller that controls communication.

At least one of the baseband circuit 212 and the CPU 215 may include a clock generator that generates a clock and may manage internal time by the clock generated by the clock generator.

For the process of the physical layer, the baseband circuit 212 performs addition of the physical header, coding, encryption, modulation process, and the like of the frame to be transmitted and generates, for example, two types of digital baseband signals (hereinafter, "digital I signal" and "digital Q signal").

The DAC 216 performs DA conversion of signals input from the baseband circuit 212. More specifically, the DAC 216 converts the digital I signal to an analog I signal and converts the digital Q signal to an analog Q signal. Note that a single system signal may be transmitted without performing quadrature modulation. When a plurality of antennas are included, and single system or multi-system transmission signals equivalent to the number of antennas are to be distributed and transmitted, the number of provided DACs and the like may correspond to the number of antennas.

The RF IC 221 is, for example, one or both of an RF analog IC and a high frequency IC. The RF IC 221 includes a filter 222, a mixer 223, a preamplifier (PA) 224, the PLL (Phase Locked Loop) 242, a low noise amplifier (LNA) 234, a balun 235, a mixer 233, and a filter 232. Some of the elements may be arranged on the baseband IC 211 or another IC. The filters 222 and 232 may be bandpass filters or low pass filters. The RF IC 221 is connected to the antenna 247 through the switch 245.

The filter 222 extracts a signal of a desired band from each of the analog I signal and the analog Q signal input from the DAC 216. The PLL 242 uses an oscillation signal input from the crystal oscillator 243 and performs one or both of division and multiplication of the oscillation signal to thereby generate a signal at a certain frequency synchronized with the phase of the input signal. Note that the PLL 242 includes a VCO (Voltage Controlled Oscillator) and uses the VCO to perform feedback control based on the oscillation signal input from the crystal oscillator 243 to thereby obtain the signal at the certain frequency. The generated signal at the certain frequency is input to the mixer 223 and the mixer 233. The PLL 242 is equivalent to an example of an oscillator that generates a signal at a certain frequency.

The mixer 223 uses the signal at the certain frequency supplied from the PLL 242 to up-convert the analog I signal and the analog Q signal passed through the filter 222 into a radio frequency. The preamplifier (PA) amplifies the analog I signal and the analog Q signal at the radio frequency generated by the mixer 223, up to desired output power. The balun 225 is a converter for converting a balanced signal (differential signal) to an unbalanced signal (single-ended signal). Although the balanced signal is handled by the RF IC 221, the unbalanced signal is handled from the output of the RF IC 221 to the antenna 247. Therefore, the balun 225 performs the signal conversions.

The switch 245 is connected to the balun 225 on the transmission side during the transmission and is connected to the balun 234 or the RF IC 221 on the reception side during the reception. The baseband IC 211 or the RF IC 221 may control the switch 245. There may be another circuit that controls the switch 245, and the circuit may control the switch 245.

The analog I signal and the analog Q signal at the radio frequency amplified by the preamplifier 224 are subjected to balanced-unbalanced conversion by the balun 225 and are then emitted as radio waves to the space from the antenna 247.

The antenna 247 may be a chip antenna, may be an antenna formed by wiring on a printed circuit board, or may be an antenna formed by using a linear conductive element.

The LNA 234 in the RF IC 221 amplifies a signal received from the antenna 247 through the switch 245 up to a level that allows demodulation, while maintaining the noise low.

The balun 235 performs unbalanced-balanced conversion of the signal amplified by the low noise amplifier (LNA) 234. The mixer 233 uses the signal at the certain frequency input from the PLL 242 to down-convert, to a baseband, the reception signal converted to a balanced signal by the balun 235. More specifically, the mixer 233 includes a unit that generates carrier waves shifted by a phase of 90 degrees based on the signal at the certain frequency input from the PLL 242. The mixer 233 uses the carrier waves shifted by a phase of 90 degrees to perform quadrature demodulation of the reception signal converted by the balun 235 and generates an I (In-phase) signal with the same phase as the reception signal and a Q (Quad-phase) signal with the phase delayed by 90 degrees. The filter 232 extracts signals with desired frequency components from the I signal and the Q signal. Gains of the I signal and the Q signal extracted by the filter 232 are adjusted, and the I signal and the Q signal are output from the RF IC 221.

The ADC 217 in the baseband IC 211 performs AD conversion of the input signal from the RF IC 221. More specifically, the ADC 217 converts the I signal to a digital I signal and converts the Q signal to a digital Q signal. Note that a single system signal may be received without performing quadrature demodulation.

When a plurality of antennas are provided, the number of provided ADCs may correspond to the number of antennas. Based on the digital I signal and the digital Q signal, the baseband circuit 212 executes a process of the physical layer and the like, such as demodulation process, error correcting code process, and process of physical header, and obtains a frame. The baseband circuit 212 applies a process of the MAC layer to the frame. Note that the baseband circuit 212 may be configured to execute a process of TCP/IP when the TCP/IP is implemented.

The baseband circuit 212 or the CPU 215 may execute a process regarding the MIMO. The baseband circuit 212 or the CPU 215 may execute at least one or a plurality of a process of propagation path estimation, a transmission weight calculation process, a separation process of stream, and the like. The baseband circuit 212 or the CPU 215 may control the operation of the filters 222 and 232 to extract signals covered by a used channel according to the setting of the channel. Another controller that controls the filters 222 and 232 may exist, and the baseband circuit 212 or the CPU 215 may issue an instruction to the controller to perform similar control.

Fourth Embodiment

Figure 24:
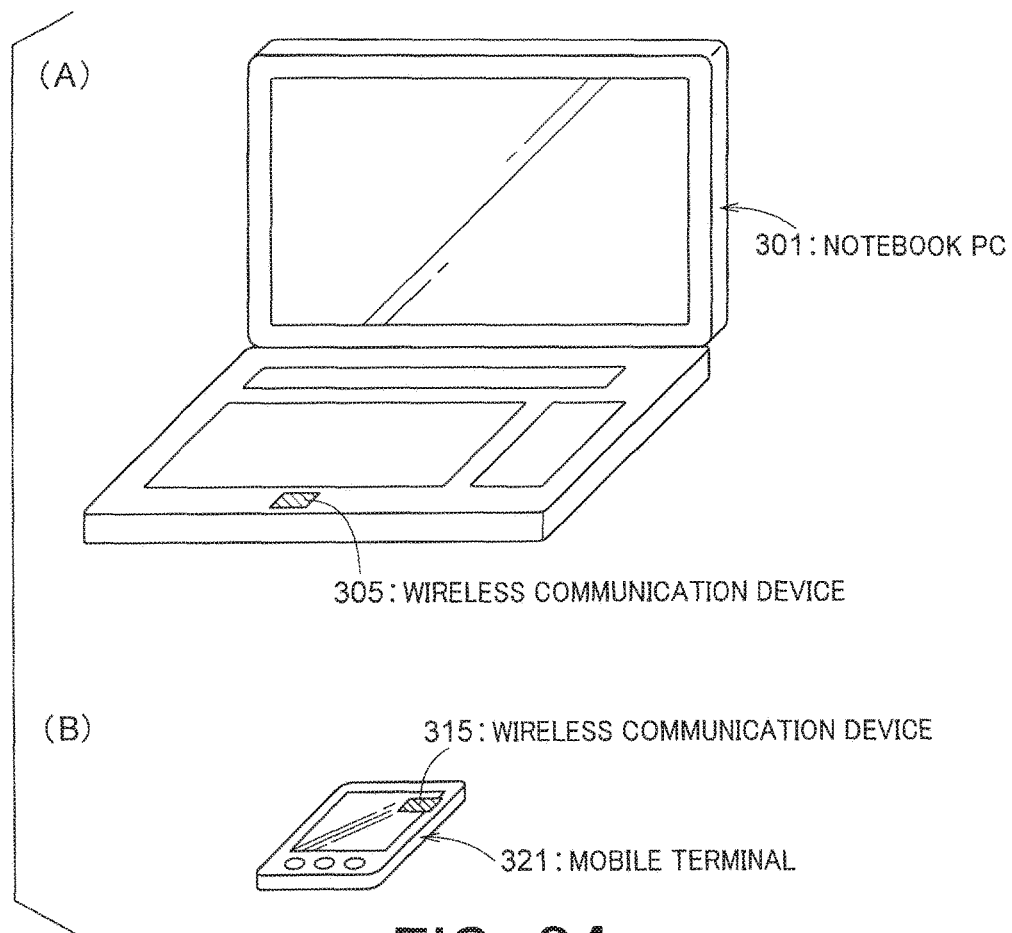
FIG. 24 is a perspective view of a wireless terminal.

FIG. 24(A) and FIG. 24(B) are perspective views of wireless terminal according to the fourth embodiment. The wireless terminal in FIG. 24(A) is a notebook PC 301 and the wireless communication device (or a wireless device) in FIG. 24(B) is a mobile terminal 321. Each of them corresponds to one form of a terminal (which may indicate a base station). The notebook PC 301 and the mobile terminal 321 are equipped with wireless communication devices 305 and 315, respectively. The wireless communication device provided in a terminal (which may indicate a base station) which has been described above can be used as the wireless communication devices 305 and 315. A wireless terminal carrying a wireless communication device is not limited to notebook PCs and mobile terminals. For example, it can be installed in a TV, a digital camera, a wearable device, a tablet, a smart phone, a gaming device, a network storage device, a monitor, a digital audio player, a web camera, a video camera, a projector, a navigation system, an external adapter, an internal adapter, a set top box, a gateway, a printer server, a mobile access point, a router, an enterprise/service provider access point, a portable device, a handheld device and so on.

Figure 25:
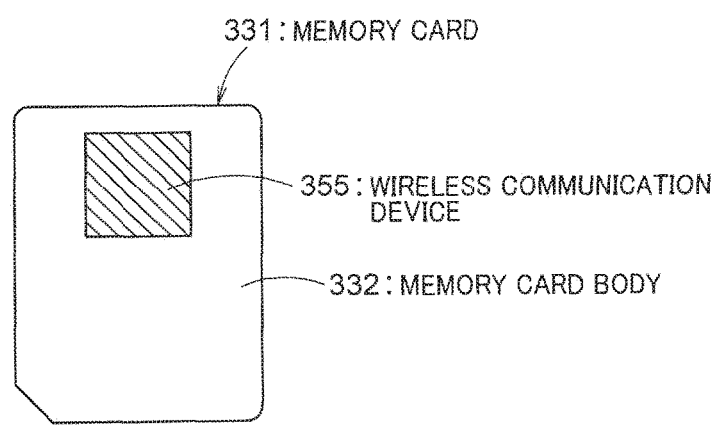
FIG. 25 is a diagram illustrating a memory card.

Moreover, a wireless communication device installed in a terminal (which may indicate a base station) can also be provided in a memory card. FIG. 25 illustrates an example of a wireless communication device mounted on a memory card. A memory card 331 contains a wireless communication device 355 and a body case 332. The memory card 331 uses the wireless communication device 355 for wireless communication with external devices. Here, in FIG. 25, the description of other installed elements (for example, a memory, and so on) in the memory card 331 is omitted.

Fifth Embodiment

In the fifth embodiment, a bus, a processor unit and an external interface unit are provided in addition to the configuration of the wireless communication device (which may indicate the base station) according to any of the above embodiments. The processor unit and the external interface unit are connected with an external memory (a buffer) through the bus. A firmware operates the processor unit. Thus, by adopting a configuration in which the firmware is included in the wireless communication device, the functions of the wireless communication device can be easily changed by rewriting the firmware. The processing unit in which the firmware operates may be a processor that performs the process of the communication controlling device or the control unit according to the present embodiment, or may be another processor that performs a process relating to extending or altering the functions of the process of the communication controlling device or the control unit. The processing unit in which the firmware operates may be included in the access point or the wireless terminal according to the present embodiment. Alternatively, the processing unit may be included in the integrated circuit of the wireless communication device installed in the access point, or in the integrated circuit of the wireless communication device installed in the wireless terminal.

Sixth Embodiment

In the sixth embodiment, a clock generating unit is provided in addition to the configuration of the wireless communication device (which may indicate the base station) according to any of the above embodiments. The clock generating unit generates a clock and outputs the clock from an output terminal to the exterior of the wireless communication device. Thus, by outputting to the exterior the clock generated inside the wireless communication device and operating the host by the clock output to the exterior, it is possible to operate the host and the wireless communication device in a synchronized manner.

Seventh Embodiment

In the seventh embodiment, a power source unit, a power source controlling unit and a wireless power feeding unit are included in addition to the configuration of the wireless communication device (which may indicate the base station) according to any of the above embodiments. The power supply controlling unit is connected to the power source unit and to the wireless power feeding unit, and performs control to select a power source to be supplied to the wireless communication device. Thus, by adopting a configuration in which the power source is included in the wireless communication device, power consumption reduction operations that control the power source are possible.

Eighth Embodiment

In the eighth embodiment, a SIM card is added to the configuration of the wireless communication device according to the above embodiments.

For example, the SIM card is connected with the controller, other units and both of them in the wireless communication device. Thus, by adopting a configuration in which the SIM card is included in the wireless communication device, authentication processing can be easily performed.

Ninth Embodiment

In the ninth embodiment, a video image compressing/decompressing unit is added to the configuration of the wireless communication device according to any of the above embodiments. The video image compressing/decompressing unit is connected to the bus. Thus, by adopting a configuration in which the video image compressing/decompressing unit is included in the wireless communication device, transmitting a compressed video image and decompressing a received compressed video image can be easily done.

Tenth Embodiment

In the tenth embodiment, an LED unit is added to the configuration of the wireless communication device of the terminal (which may indicate the base station) according to any of the above embodiments. For example, the LED unit is connected to the controller, other units and both of them in the wireless communication device. Thus, by adopting a configuration in which the LED unit is included in the wireless communication device, notifying the operation state of the wireless communication device to the user can be easily done.

Eleventh Embodiment

In the eleventh embodiment, a vibrator unit is included in addition to the configuration of the wireless communication device wireless communication device of the terminal (which may indicate the base station) according to any of the above embodiments. For example, the vibrator unit is connected to at least one of the controller, other units and both of them in the wireless communication device. Thus, by adopting a configuration in which the vibrator unit is included in the wireless communication device, notifying the operation state of the wireless communication device to the user can be easily done.

Twelfth Embodiment

In a twelfth embodiment, the configuration of the wireless communication device includes a display in addition to the configuration of the wireless communication device (the wireless communication device of the terminal (which may indicate the base station) according to any one of the above h embodiments. The display may be connected to the controller, other units and both of them in the wireless communication device via a bus (not shown). As seen from the above, the configuration including the display to display the operation state of the wireless communication device on the display allows the operation status of the wireless communication device to be easily notified to a user.

Thirteenth Embodiment

In the present embodiment, [1] the frame type in the wireless communication system, [2] a technique of disconnection between wireless communication devices, [3] an access scheme of a wireless LAN system and [4] a frame interval of a wireless LAN are described.

[1] Frame Type in Communication System

Generally, as mentioned above, frames treated on a wireless access protocol in a wireless communication system are roughly divided into three types of the data frame, the management frame and the control frame. These types are normally shown in a header part which is commonly provided to frames. As a display method of the frame type, three types may be distinguished in one field or may be distinguished by a combination of two fields. In the IEEE 802.11 standard, identification of a frame type is made based on two fields of Type and Subtype in the Frame Control field in the header part of the MAC frame. The Type field is one for generally classifying frames into a data frame, a management frame, or a control frame and the Subtype field is one for identifying more detailed type in each of the classified frame types such as a beacon frame belonging to the management frame.

The management frame is a frame used to manage a physical communication link with a different wireless communication device. For example, there are a frame used to perform communication setting with the different wireless communication device or a frame to release communication link (that is, to disconnect the connection), and a frame related to the power save operation in the wireless communication device.

The data frame is a frame to transmit data generated in the wireless communication device to the different wireless communication device after a physical communication link with the different wireless communication device is established. The data is generated in a higher layer of the present embodiment and generated by, for example, a user's operation.

The control frame is a frame used to perform control at the time of transmission and reception (exchange) of the data frame with the different wireless communication device. A response frame transmitted for the acknowledgment in a case where the wireless communication device receives the data frame or the management frame, belongs to the control frame. The response frame is, for example, an ACK frame or a BlockACK frame. The RTS frame and the CTS frame are also the control frame.

These three types of frames are subjected to processing based on the necessity in the physical layer and then transmitted as physical packets via an antenna. In IEEE 802.11 standard (including the extended standard such as IEEE Std 802.11ac-2013), an association process is defined as one procedure for connection establishment. The association request frame and the association response frame which are used in the procedure are a management frame. Since the association request frame and the association response frame is the management frame transmitted in a unicast scheme, the frames causes the wireless communication terminal in the receiving side to transmit an ACK frame being a response frame. The ACK frame is a control frame as described in the above.

[2] Technique of Disconnection Between Wireless Communication Devices

For disconnection, there are an explicit technique and an implicit technique. As the explicit technique, a frame to disconnect any one of the connected wireless communication devices is transmitted. This frame corresponds to Deauthentication frame defined in IEEE 802.11 standard and is classified into the management frame. The frame for disconnection may be referred to as "release frame" by the meaning of releasing connection, for example. Normally, it is determined that the connection is disconnected at the timing of transmitting the release frame in a wireless communication device on the side to transmit the release frame and at the timing of receiving the release frame in a wireless communication device on the side to receive the release frame. Afterward, it returns to the initial state in a communication phase, for example, a state to search for a wireless communication device of the communicating partner. In a case that the wireless communication base station disconnects with a wireless communication terminal, for example, the base station deletes information on the wireless communication device from a connection management table if the base station holds the connection management table for managing wireless communication terminals which entries into the BSS of the base station-self. For example, in a case that the base station assigns an AID to each wireless communication terminal which entries into the BSS at the time when the base station permitted each wireless communication terminal to connect to the base station-self in the association process, the base station deletes the held information related to the AID of the wireless communication terminal disconnected with the base station and may release the AID to assign it to another wireless communication device which newly entries into the BSS.

On the other hand, as the implicit technique, it is determined that the connection state is disconnected in a case where frame transmission (transmission of a data frame and management frame or transmission of a response frame with respect to a frame transmitted by the subject device) is not detected from a wireless communication device of the connection partner which has established the connection for a certain period. Such a technique is provided because, in a state where it is determined that the connection is disconnected as mentioned above, a state is considered where the physical wireless link cannot be secured, for example, the communication distance to the wireless communication device of the connection destination is separated and the radio signals cannot be received or decoded. That is, it is because the reception of the release frame cannot be expected.

As a specific example to determine the disconnection of connection in an implicit method, a timer is used. For example, at the time of transmitting a data frame that requests an acknowledgment response frame, a first timer (for example, a retransmission timer for a data frame) that limits the retransmission period of the frame is activated, and, if the acknowledgement response frame to the frame is not received until the expiration of the first timer (that is, until a desired retransmission period passes), retransmission is performed. When the acknowledgment response frame to the frame is received, the first timer is stopped.

On the other hand, when the acknowledgment response frame is not received and the first timer expires, for example, a management frame to confirm whether a wireless communication device of a connection partner is still present (in a communication range) (in other words, whether a wireless link is secured) is transmitted, and, at the same time, a second timer (for example, a retransmission timer for the management frame) to limit the retransmission period of the frame is activated. Similarly to the first timer, even in the second timer, retransmission is performed if an acknowledgment response frame to the frame is not received until the second timer expires, and it is determined that the connection is disconnected when the second timer expires.

Alternatively, a third timer is activated when a frame is received from a wireless communication device of the connection partner, the third timer is stopped every time the frame is newly received from the wireless communication device of the connection partner, and it is activated from the initial value again. When the third timer expires, similarly to the above, a management frame to confirm whether the wireless communication device of the connection party is still present (in a communication range) (in other words, whether a wireless link is secured) is transmitted, and, at the same time, a second timer (for example, a retransmission timer for the management frame) to limit the retransmission period of the frame is activated. Even in this case, retransmission is performed if an acknowledgment response frame to the frame is not received until the second timer expires, and it is determined that the connection is disconnected when the second timer expires. The latter management frame to confirm whether the wireless communication device of the connection partner is still present may differ from the management frame in the former case. Moreover, regarding the timer to limit the retransmission of the management frame in the latter case, although the same one as that in the former case is used as the second timer, a different timer may be used.

[3] Access Scheme of Wireless LAN System

For example, there is a wireless LAN system with an assumption of communication or competition with a plurality of wireless communication devices. CSMA/CA is set as the basis of an access scheme in the IEEE802.11 (including an extension standard or the like) wireless LAN. In a scheme in which transmission by a certain wireless communication device is grasped and transmission is performed after a fixed time from the transmission end, simultaneous transmission is performed in the plurality of wireless communication devices that grasp the transmission by the wireless communication device, and, as a result, radio signals collide and frame transmission fails. By grasping the transmission by the certain wireless communication device and waiting for a random time from the transmission end, transmission by the plurality of wireless communication devices that grasp the transmission by the wireless communication device stochastically disperses. Therefore, if the number of wireless communication devices in which the earliest time in a random time is subtracted is one, frame transmission by the wireless communication device succeeds and it is possible to prevent frame collision. Since the acquisition of the transmission right based on the random value becomes impartial between the plurality of wireless communication devices, it can say that a scheme adopting Carrier Avoidance is a suitable scheme to share a radio medium between the plurality of wireless communication devices.

[4] Frame Interval of Wireless LAN

The frame interval of the IEEE802.11 wireless LAN is described. There are several types of frame intervals used in the IEEE802.11 wireless LAN, such as distributed coordination function interframe space (DIFS), arbitration interframe space (AIFS), point coordination function interframe space (PIFS), short interframe space (SIFS), extended interframe space (EIFS) and reduced interframe space (RIFS).

The definition of the frame interval is defined as a continuous period that should confirm and open the carrier sensing idle before transmission in the IEEE802.11 wireless LAN, and a strict period from a previous frame is not discussed. Therefore, the definition is followed in the explanation of the IEEE802.11 wireless LAN system. In the IEEE802.11 wireless LAN, a waiting time at the time of random access based on CSMA/CA is assumed to be the sum of a fixed time and a random time, and it can say that such a definition is made to clarify the fixed time.

DIFS and AIFS are frame intervals used when trying the frame exchange start in a contention period that competes with other wireless communication devices on the basis of CSMA/CA. DIFS is used in a case where priority according to the traffic type is not distinguished, AIFS is used in a case where priority by traffic identifier (TID) is provided.

Since operation is similar between DIFS and AIFS, an explanation below will mainly use AIFS. In the IEEE802.11 wireless LAN, access control including the start of frame exchange in the MAC layer is performed. In addition, in a case where QoS (Quality of Service) is supported when data is transferred from a higher layer, the traffic type is notified together with the data, and the data is classified for the priority at the time of access on the basis of the traffic type. The class at the time of this access is referred to as "access category (AC)". Therefore, the value of AIFS is provided every access category.

PIFS denotes a frame interval to enable access which is more preferential than other competing wireless communication devices, and the period is shorter than the values of DIFS and AIFS. SIFS denotes a frame interval which can be used in a case where frame exchange continues in a burst manner at the time of transmission of a control frame of a response system or after the access right is acquired once. EIFS denotes a frame interval caused when frame reception fails (when the received frame is determined to be error).

RIFS denotes a frame interval which can be used in a case where a plurality of frames are consecutively transmitted to the same wireless communication device in a burst manner after the access right is acquired once, and a response frame from a wireless communication device of the transmission partner is not requested while RIFS is used.

Figure 26:
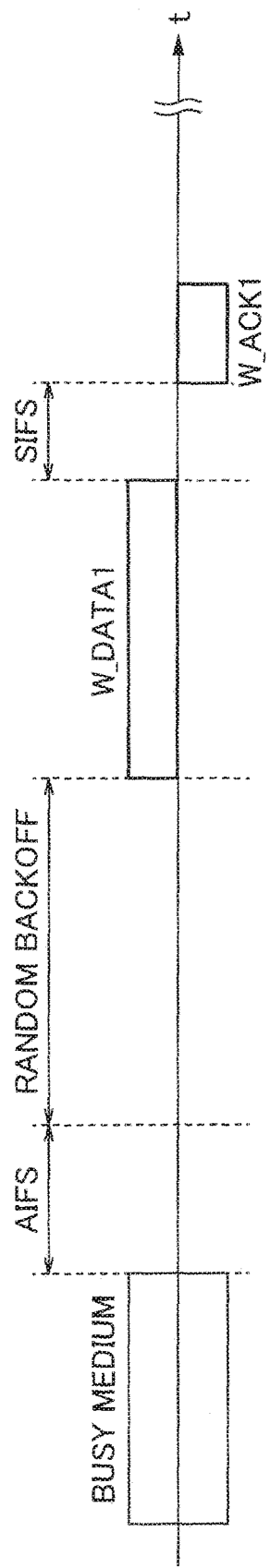
FIG. 26 is a diagram illustrating an example of frame exchange during a contention period.

Here, FIG. 26 illustrates one example of frame exchange in a competitive period based on the random access in the IEEE802.11 wireless LAN.

When a transmission request of a data frame (W_DATA1) is generated in a certain wireless communication device, a case is assumed where it is recognized that a medium is busy (busy medium) as a result of carrier sensing. In this case, AIFS of a fixed time is set from the time point at which the carrier sensing becomes idle, and, when a random time (random backoff) is set afterward, data frame W_DATA1 is transmitted to the communicating partner.

The random time is acquired by multiplying a slot time by a pseudorandom integer led from uniform distribution between contention windows (CW) given by integers from 0. Here, what multiplies CW by the slot time is referred to as "CW time width". The initial value of CW is given by CWmin, and the value of CW is increased up to CWmax every retransmission. Similarly to AIFS, both CWmin and CWmax have values every access category. In a wireless communication device of transmission destination of W_DATA1, when reception of the data frame succeeds, a response frame (W_ACK1) is transmitted after SIFS from the reception end time point. If it is within a transmission burst time limit when W_ACK1 is received, the wireless communication device that transmits W_DATA1 can transmit the next frame (for example, W_DATA2) after SIFS.

Although AIFS, DIFS, PIFS and EIFS are functions between SIFS and the slot-time, SIFS and the slot time are defined every physical layer. Moreover, although parameters whose values being set according to each access category, such as AIFS, CWmin and CWmax, can be set independently by a communication group (which is a basic service set (BSS) in the IEEE802.11 wireless LAN), the default values are defined.

For example, in the definition of 802.11ac, with an assumption that SIFS is 16 µs and the slot time is 9 µS, and thereby PIFS is 25 µs, DIFS is 34 µs, the default value of the frame interval of an access category of BACKGROUND (AC_BK) in AIFS is 79 µs, the default value of the frame interval of BEST EFFORT (AC_BE) is 43 µs, the default value of the frame interval between VIDEO(AC_VI) and VOICE(AC_VO) is 34 µs, and the default values of CWmin and CWmax are 31 and 1023 in AC_BK and AC_BE, 15 and 31 in AC_VI and 7 and 15 in AC_VO. Here, EIFS denotes the sum of SIFS, DIFS, and the time length of a response frame transmitted at the lowest mandatory physical rate. In the wireless communication device which can effectively takes EIFS, it may estimate an occupation time length of a PHY packet conveying a response frame directed to a PHY packet due to which the EIFS is caused and calculates a sum of SIFS, DIFS and the estimated time to take the EIFS.

The terms used in each embodiment should be interpreted broadly. For example, the term "processor" may encompass a general purpose processor, a central processing unit (CPU), a microprocessor, a digital signal processor (DSP), a controller, a microcontroller, a state machine, and so on. According to circumstances, a "processor" may refer to an application specific integrated circuit (ASIC), a field programmable gate array (FPGA), and a programmable logic device (PLD), etc. The term "processor" may refer to a combination of processing devices such as a plurality of microprocessors, a combination of a DSP and a microprocessor, or one or more microprocessors in conjunction with a DSP core.

As another example, the term "memory" may encompass any electronic component which can store electronic information. The "memory" may refer to various types of media such as a random access memory (RAM), a read-only memory (ROM), a programmable read-only memory (PROM), an erasable programmable read only memory (EPROM), an electrically erasable PROM (EEPROM), a non-volatile random access memory (NVRAM), a flash memory, and a magnetic or optical data storage, which are readable by a processor. It can be said that the memory electronically communicates with a processor if the processor read and/or write information for the memory. The memory may be arranged within a processor and also in this case, it can be said that the memory electronically communication with the processor. The term "circuitry" may refer to not only electric circuits or a system of circuits used in a device but also a single electric circuit or a part of the single electric circuit.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

The invention claimed is:

1. A wireless communication device comprising:
communication circuitry configured to:
communicate a first frame with a first wireless communication device during a first period and a second frame with a second wireless communication device during a second period, wherein the first period and the second period are at least partially overlapped; and
communicate a third frame indicating acknowledgement of the first frame with the first wireless communication device during a third period and a fourth frame indicating acknowledgement of the second frame with the second wireless communication device during a fourth period after elapse of both the first period and the second period, wherein the fourth period is started from one of a first timing and a second timing defined by wireless communication standards; and
controlling circuitry configured to:
set the third period to eliminate overlap with the fourth period, wherein the third period is started from another one of the first timing and the second timing; and
determine whether the second frame is successfully communicated based on whether the one of the first timing and the second timing has elapsed without reception of the fourth frame.

2. The wireless communication device according to claim 1, wherein
the communication circuitry is further configured to:
transmit a fifth frame including a notification of transmission permission to the first wireless communication device;
receive the first frame from the first wireless communication device during the first period;
transmit the second frame to the second wireless communication device during the second period in elapse of a first interval after transmission of the fifth frame;
receive the fourth frame from the second wireless communication device in elapse of a second interval after transmission of the second frame; and
transmit the third frame to the first wireless communication device in elapse of a third interval after reception of the first frame, wherein the third interval is longer than a total of the second interval and the fourth period.

3. The wireless communication device according to claim 2, wherein
the communication circuitry is configured to receive a sixth frame to request the transmission permission from the first wireless communication device and transmit the fifth frame to the first wireless communication device in elapse of a fourth interval after reception of the sixth frame,
the sixth frame includes first information indicating a length of a period in which a wireless medium is exclusively used, and
the fifth frame includes second information indicating a length shorter than an expected value, and the expected value is a value subtracted from the length of the period indicated by the first information by the fourth interval and a length of the fifth frame.

4. The wireless communication device according to claim 1, wherein
the communication circuitry is further configured to:
transmit a fifth frame including a notification of transmission permission;
receive the first frame from the first wireless communication device during the first period and transmit the second frame to the second wireless communication device during the second period in elapse of a first interval after transmission of the fifth frame;
transmit the third frame during the third period in elapse of a second interval after reception of the first frame; and
receive the fourth frame during the fourth period in elapse of a third interval after transmission of the second frame,
wherein the third interval is longer than a total of the second interval and the fourth period.

5. The wireless communication device according to claim 1, wherein
the first wireless communication device is the same wireless communication device as the second wireless communication device,
the communication circuitry is further configured to:
receive a fifth frame addressed to the wireless communication device, which includes a notification of transmission permission, from the first wireless communication device and transmit the first frame during the first period in elapse of a first interval after reception of the fifth frame;
receive the third frame from the first wireless communication device during the third period in elapse of a second interval after transmission of the first frame; and
transmit the fourth frame to the first wireless communication device during the fourth period in elapse of a third interval after reception of the second frame, when the second frame addressed to the wireless communication device is received in elapse of the first interval after reception of the fifth frame, and
the third interval is longer than a total of the second interval and the third period.

6. The wireless communication device according to claim 1, wherein
the first wireless communication device is the same wireless communication device as the second wireless communication device,
the communication circuitry is further configured to:
receive a fifth frame addressed to the wireless communication device, which includes a notification of transmission permission, from the first wireless communication device;
transmit the first frame to the first wireless communication device during the first period in elapse of a first time interval after reception of the fifth frame
transmit the fourth frame to the first wireless communication device during the fourth period in elapse of a second interval after reception of the second frame, when the second frame addressed to the device is received in elapse of the first interval after reception of the fifth frame; and receive the third frame from the first wireless communication device in elapse of a third interval after transmission of the first frame, and the third interval is longer than a total of the second interval and the fourth period.

7. The wireless communication device according to claim 1, wherein the first wireless communication device is the same wireless communication device as the second wireless communication device, the communication circuitry is further configured to;

transmit a fifth frame to the first wireless communication device which includes a notification of transmission permission;

receive the first frame from the first wireless communication device during the first period and transmit the second frame to the first wireless communication device during the second period in elapse of a first interval after transmission of the fifth frame;

receive the fourth frame from the first wireless communication device during the fourth period in elapse of a second interval after transmission of the second frame; and transmit the third frame to the first wireless communication device during the third period in elapse of a third interval after reception of the first frame, and the third interval is longer than a total of the second interval and the fourth period.

8. The wireless communication device according to claim 1, wherein the first wireless communication device is the same wireless communication device as the second wireless communication device, the communication circuitry is further configured to:

transmit a fifth frame which includes a notification of transmission permission, to the first wireless communication device;

receive the first frame from the first wireless communication device during the first period and transmit the second frame to the first wireless communication device during the second period, in elapse of a first interval after transmission of the fifth frame;

transmit the third frame to the first wireless communication device during the third period in elapse of a second interval after reception of the first frame; and receive the fourth frame from the first wireless communication device during the fourth period in elapse of a third interval after transmission of the second frame, and the third interval is longer than a total of the second interval and the third period.

9. The wireless communication device according to claim 1, further comprising at least one antenna.

10. The wireless communication device according to claim 1, wherein the communication circuitry comprises transmitting circuitry and receiving circuitry.

11. A wireless communication device comprising:

receiving circuitry configured to receive a first frame addressed to the wireless communication device, which includes a notification of transmission permission, from a first wireless communication device; and transmitting circuitry configured to transmit a second frame to the first wireless communication device during a first period in elapse of a first time interval after reception of the first frame, wherein the receiving circuitry is configured to receive a third frame from the first wireless communication device during a second period in elapse of a second interval after transmission of the second frame, the third frame indicates acknowledgement to the second frame, wherein the first frame includes first information indicating a length of a period in which a wireless medium is exclusively used, the second interval is longer than a sum of a third interval and a third period, wherein the third period is a period during which a fourth frame indicating acknowledgement of a fifth frame transmitted from the first wireless communication device during a fourth period is transmitted from a second wireless communication device, the third interval is an interval at which the fourth frame is transmitted after the fifth frame is transmitted, and wherein the first period and the fourth period are at least partially overlapped.

12. The wireless communication device according to claim 11, wherein the transmitting circuitry is further configured to transmit a sixth frame which requests the transmission permission to the first wireless communication device, and the receiving circuitry is configured to receive the first frame from the first wireless communication device as a response to the sixth frame in elapse of a fourth interval after transmission of the fourth frame, the sixth frame includes second information indicating the length of a period in which the wireless medium is exclusively used.

13. The wireless communication device according to claim 12, further comprising:

controlling circuitry configured to control a timeout period for acknowledgement of the third frame based on whether the first information matches an expected value, the expected value being a value subtracted from the second information by a length of the fourth interval and a length of the first frame.

14. The wireless communication device according to claim 11, further comprising at least one antenna.

15. A wireless communication device comprising:

receiving circuitry configured to receive a first frame from a first wireless communication device and receive a second frame from the first wireless communication device during a first period in elapse of a first interval after reception of the first frame; and transmitting circuitry configured to transmit a third frame indicating an acknowledgement to the second frame during a second period in elapse of a second interval after reception of the second frame to the first wireless communication device when the first frame is addressed to a second wireless communication device, the first frame includes a notification of transmission permission to the second wireless communication device and the second frame is addressed to the wireless communication device, wherein the second interval is longer than a total of a length of a third period and a third interval, wherein the third period is a period during which a fourth frame indicating acknowledgement of a fifth frame transmitted from the second wireless communication device during a fourth period is transmitted from the first wireless communication device, wherein the third interval is an interval at which the fourth frame is transmitted after the fifth frame is transmitted, wherein the first period and the fourth period are at least partially overlapped, and the second period is set to eliminate overlap with the third period.

16. The wireless communication device according to claim 14, further comprising at least one antenna.

17. A wireless communication method comprising:
communicating a first frame with a first wireless communication device during a first period and a second frame with a second wireless communication device during a second period, wherein the first period and the second period are at least partially overlapped;
communicating a third frame indicating acknowledgement of the first frame with the first wireless communication device during a third period and a fourth frame indicating acknowledgement of the second frame with the second wireless communication device during a fourth period after elapse of both the first period and the second period, wherein the fourth period is started from one of a first timing and a second timing defined by wireless communication standards;
setting the third period to eliminate overlap with the fourth period, wherein the third period is started from another one of the first timing and the second timing; and
determining whether the second frame is successfully communicated based on whether the one of the first timing and the second timing has elapsed without reception of the fourth frame.

18. A wireless communication device being able to communicate with a wireless communication device conforming to a first wireless communication standard supporting a full duplex communication and communicate with a wireless communication device conforming to a second wireless communication standard not supporting the full duplex communication, comprising:
communication circuitry configured to
communicate a first frame with a first wireless communication device during a first period,
communicate a second frame with a second wireless communication device during a second period wherein the first period and the second period are at least partially overlapped, and
if the first wireless communication device conforms to the first wireless communication standard and the second wireless communication device conforms to the second wireless communication standard, (1) communicate a fourth frame indicating acknowledgement of the second frame with the second wireless communication device during a fourth period starting at a first timing defined by the second wireless communication standard after the first frame is communicated and (2) communicate a third frame indicating acknowledgement of the first frame with the first wireless communication device during a third period starting at a second timing different from the first timing after the second frame is communicated; and
controlling circuitry configured to set the third period to eliminate overlap with the fourth period,
wherein the first frame and the second frame are communicated through at least part of functions of the full duplex communication.

19. A wireless communication method performed in an electric apparatus being able to communicate with a wireless communication device conforming to a first standard supporting a full duplex communication and communicate with a wireless communication device conforming to a second standard not supporting the full duplex communication, the method comprising:
communicating a first frame with a first wireless communication device during a first period;
communicating a second frame with a second wireless communication device during a second period wherein the first period and the second period are at least partially overlapped;
if the first wireless communication device conforms to the first wireless communication standard and the second wireless communication device conforms to the second wireless communication standard, (1) communicating a fourth frame indicating acknowledgement of the second frame with the second wireless communication device during a fourth period starting at a first timing defined by the second wireless communication standard after the first frame is communicated and (2) communicating a third frame indicating acknowledgement of the first frame with the first wireless communication device during a third period starting at a second timing different from the first timing after the second frame is communicated; and
setting the third period to eliminate overlap with the fourth period,
wherein the first frame and the second frame are communicated through at least part of functions of the full duplex communication.

* * * * *